(12) United States Patent
Hong et al.

(10) Patent No.: US 10,883,072 B2
(45) Date of Patent: Jan. 5, 2021

(54) BEVERAGE MAKER

(71) Applicant: LG ELECTRONICS INC., Seoul (KR)

(72) Inventors: Jinpyo Hong, Seoul (KR); Shic Yoon, Seoul (KR); Daewoong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 237 days.

(21) Appl. No.: 16/038,585

(22) Filed: Jul. 18, 2018

(65) Prior Publication Data
US 2019/0024028 A1   Jan. 24, 2019

(30) Foreign Application Priority Data

Jul. 19, 2017   (KR) .................. 10-2017-0091255

(51) Int. Cl.
*C12C 11/00* (2006.01)
*C12C 13/10* (2006.01)

(52) U.S. Cl.
CPC ............ *C12C 13/10* (2013.01); *C12C 11/006* (2013.01)

(58) Field of Classification Search
CPC ........ C12C 13/10; C12C 11/006; C12C 11/00
USPC ......................................... 99/276, 277, 278
See application file for complete search history.

(56) References Cited

U.S. PATENT DOCUMENTS

| | | | | |
|---|---|---|---|---|
| 3,713,839 A | * | 1/1973 | Delente ................ | C12C 11/003 426/11 |
| 5,947,197 A | * | 9/1999 | Lee ..................... | A23B 7/10 165/206 |
| 2007/0180839 A1 | * | 8/2007 | Kim ...................... | F25B 21/02 62/178 |
| 2008/0155993 A1 | * | 7/2008 | Kuehl .................. | F25D 11/02 62/3.6 |
| 2016/0076807 A1 | | 3/2016 | McMahon | |
| 2016/0077678 A1 | * | 3/2016 | Reese .................. | A21D 8/06 99/342 |

(Continued)

FOREIGN PATENT DOCUMENTS

CN   104498246   4/2015

OTHER PUBLICATIONS

European Search Report issued in Application No. 18180008.7 dated Nov. 12, 2018.

*Primary Examiner* — Reginald Alexander
(74) *Attorney, Agent, or Firm* — KED & Associates LLP

(57) ABSTRACT

A beverage maker may include a fermentation device including a fermentation tank assembly having an opening, and a fermentation lid that opens and closes the opening, a refrigeration cycle including a compressor, a condenser, an expansion mechanism, and an evaporator formed therein such that a refrigerant circulates in the compressor, the condenser, the expansion mechanism, and the evaporator, which may adjust a temperature inside the fermentation tank assembly; a blower that may dissipate heat emitted by the condenser; a gas discharger connected to the fermentation device that discharges gas inside the fermentation device; and a rear cover provided behind the fermentation device which may include a through-hole such that both air blown by the blower and gas discharged from the gas discharger may be discharged through the through-hole.

16 Claims, 16 Drawing Sheets

(56) References Cited

U.S. PATENT DOCUMENTS

2016/0116204 A1* 4/2016 Li .................... F04D 25/08
 62/428
2016/0201018 A1* 7/2016 Watson ............... A47J 27/08
 426/11

* cited by examiner

BEVERAGE MAKER

CROSS-REFERENCE TO RELATED APPLICATION(S)

This application claims priority under 35 U.S.C. 119 and 35 U.S.C. 365 to Korean Patent Application No. 10-2017-0091255 filed on Jul. 19, 2017 in Korea, the entire contents of which is hereby incorporated by reference in its entirety.

BACKGROUND

1. Field

A beverage maker is disclosed herein.

2. Background

Beverages may be collectively referred to as drinkable liquids such as alcoholic drinks and teas. Beverages may be classified into various categories including thirst quenching drinks such as water, drinks having a unique flavor such as fruit drinks, refreshing drinks such as carbonated soft drinks, aphrodisiac beverages, and alcoholic beverages, for example. Beer is an alcoholic beverage that may be produced with malt made by sprouting barley to make juice, wort, or liquid extract, filtering the liquid extract, adding hops to the filtered liquid extract, and then fermenting the liquid extract using yeast. A consumer may buy ready-made products produced and sold by beer manufacturers, or may drink house beer (or craft beer) produced by directly fermenting beer ingredients in a house or a bar.

House beer may be manufactured in a large variety of types of beer as compared with ready-made beer products, and may be manufactured in accordance with tastes of consumers. Ingredients or materials used to produce beer may include water, malt, hops, yeast, scent or flavor additives, as an example. Yeast may ferment the malt while it is added to the malt, and may help to produce alcohol and carbonic acid. The scent or flavor additives may include fruits, syrup, and vanilla beans, which may enhance the taste of the beer.

In general, house beer may be produced in three steps including a wort generation step, a fermentation step, and a maturation step. It may take two to three weeks to complete all three steps. It is important that house beer is maintained at an optimum temperature during fermentation. Simpler production or manufacturing processes of house beer are generally more convenient for beer producers and consumers. Recently, consumers have started using beverage makers, which may easily produce beer in a house or a bar. Such a beverage maker should safely and easily produce beer.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the accompanying drawings. Although beer will be described hereinafter as an example of a beverage produced using a beverage maker according to embodiments, beverages that may be produced using the beverage maker are not limited to beer, and various kinds of beverages may be produced by a beverage maker according to an embodiment.

Figure 1:
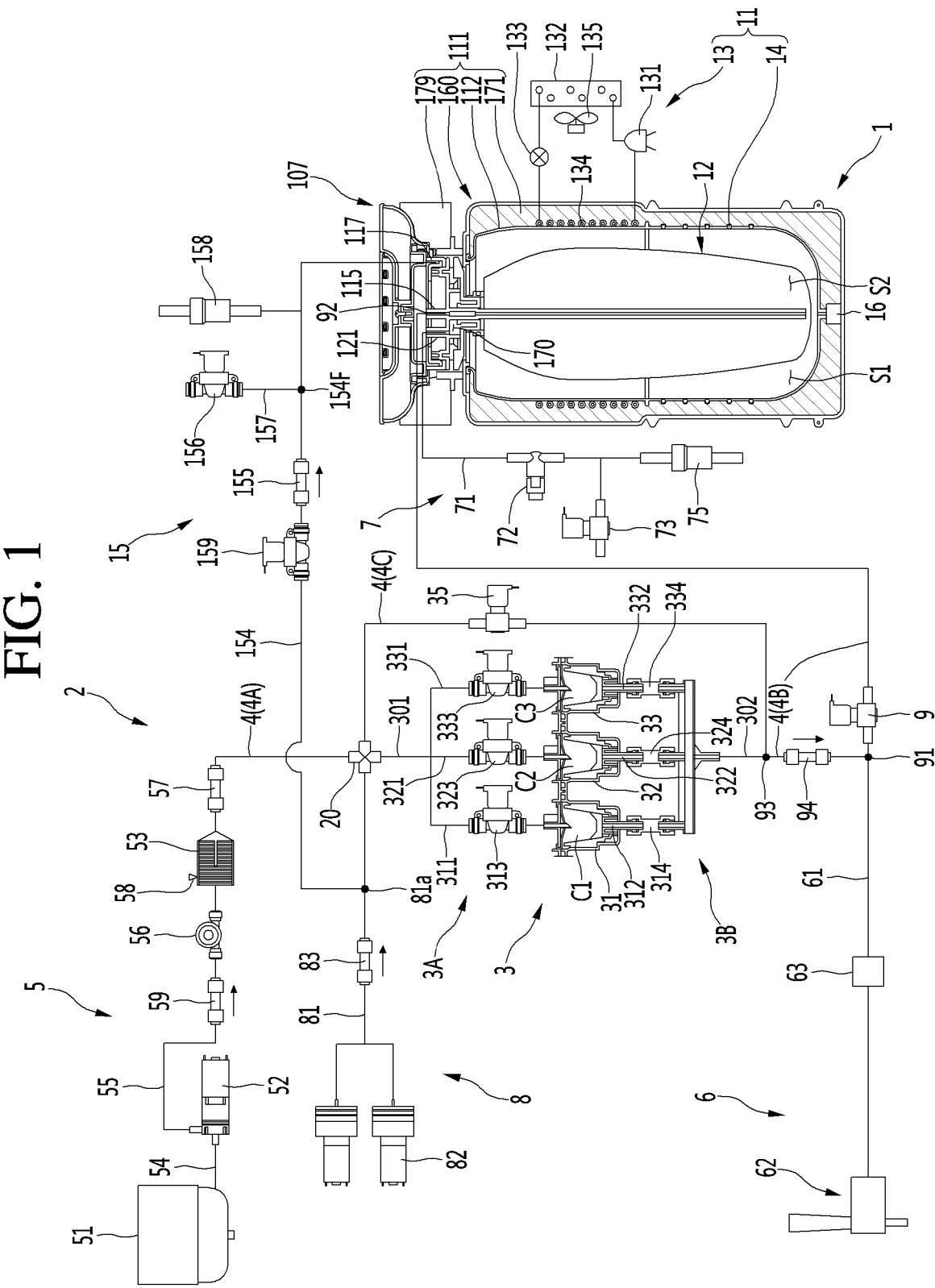
FIG. 1 is a view illustrating a beverage maker according to an embodiment.

FIG. 1 is a view illustrating a beverage maker according to an embodiment. The beverage maker may include a fermentation module or fermentation device 1. The fermentation device 1 may include a fermentation tank module or fermentation tank assembly 111 having an opening 170 formed therein, and a fermentation lid 107 that opens and/or closes the opening 170. Also, the beverage maker may further include a temperature controller 11 that adjusts the temperature inside the fermentation tank assembly 111.

The fermentation tank assembly 111 may include a fermentation case 160, a fermentation tank 112 provided in the fermentation case 160 and having an inner space S1 formed therein to communicate with the opening 170, and an insulation portion or insulation layer 171 located between the fermentation case 160 and the fermentation tank 112 that surrounds the fermentation tank 112. The fermentation tank assembly 111 may further include a lid seated body or lid body 179 on which the fermentation lid 107 is seated. The inner space S1 of the fermentation tank 112 may be a space where a beverage is produced.

The beverage maker may further include a channel module or channel assembly 2 connected to the fermentation device 1. The channel assembly 2 may include at least one channel and at least one valve. The channel assembly 2 may include a main channel 4 connected to the fermentation device 1. The main channel 4 may supply water or various materials required to produce a beverage in the space S1 of the fermentation tank 112. Also, the channel assembly 2 may further include a main valve 9 installed in the main channel 4. The main valve 9 may open and/or close the main channel 4.

The beverage maker may further include a material supplier 3 connected to the main channel 4 and having material accommodating portions formed therein. The channel assembly 2 may further include an inlet module or material inlet 3A and an outlet module or material outlet 3B connecting the material supplier 3 and the main channel 4. The beverage maker may further include a water tank 51 in which water is stored, and the channel assembly 2 may further include a water supplier 5 that supplies water from the water tank 51 to the main channel 4.

The channel assembly 2 may further include a beverage discharger 6 through which the beverage may be discharged to the outside. The beverage discharger 6 may further include a beverage discharge channel 61 connected to the main channel 4. The beverage inside the fermentation tank 112 may flow to the main channel 4, and may pass through a portion of the main channel 4 to flow to the beverage discharge channel 61.

The channel assembly 2 may further include a gas discharge channel module or gas discharger 7 connected to the fermentation device 1. The gas discharger 7 may discharge gas inside a fermentation container 12 to the outside. The inner space S1 of the fermentation tank 112 may be a space where the fermentation container 12 is provided. The beverage maker may further include an air injection pump 82 that may pump air, and the channel assembly 2 may further include an air injection channel module or air supplier 8 connected to the air injection pump 82 that injects the air into the main channel 4. The channel assembly 2 may further include an air controlling channel assembly 15 connected to the fermentation device 1. The air controlling channel assembly 15 may inject air into or discharge air from the fermentation device 1.

A main channel connector 115 may be provided in the fermentation device 1 and may be connected to the main channel 4. The fermentation lid 107, which may seal the inside of the fermentation tank assembly 111, may be provided above the fermentation tank assembly 111 and cover the opening 170. The main channel connector 115 connected to the main channel 4 may be provided in the fermentation lid 107.

The fermentation container 12 may be separately provided to prevent materials, ingredients, or a completed beverage from sticking to an inner wall of the fermentation tank 112. The fermentation container 12 may be able to detach from the fermentation tank 112. The fermentation container 12 may be provided inside the fermentation tank assembly 111 to ferment a beverage inside the fermentation tank assembly 111, and may be brought to the outside of the fermentation tank assembly 111 after being used.

The fermentation container 12 may accommodate materials or ingredients used to produce the beverage, or beverage materials. A beverage producing space S2 in which the beverage materials are accommodated and in which the beverage is produced may be provided inside the fermentation container 12, which may be smaller than the inner space S1 of the fermentation tank 112.

The fermentation container 12 may be inserted into and accommodated in the fermentation tank assembly 111 while the beverage materials are accommodated therein. The fermentation container 12 may be inserted into the fermentation tank assembly 111 and may be provided in a state in which the opening 170 of the fermentation tank assembly 111 is open. After the fermentation container 12 is inserted into the fermentation tank assembly 111, the fermentation lid 107 may cover the opening 170 of the fermentation tank assembly 111. The fermentation container 12 may help to ferment the beverage materials when it is provided in the inner space S1 sealed by the fermentation tank 112 and the fermentation lid 107. The fermentation container 12 may expand due to pressure therein while the beverage is produced.

When the beverage contained in the fermentation container 12 is discharged, and air is supplied to and between the fermentation tank 112 and the fermentation container 12, the fermentation container 12 may be compressed by the air inside the fermentation tank 112. The fermentation case 160 may constitute an outer appearance of the fermentation tank assembly 111. The fermentation tank 112 may be provided inside the fermentation case 160. The outer circumference and the bottom surface of the fermentation tank 112 may be spaced apart from the inner surface of the fermentation case 160. The insulation layer 171 may be provided between the fermentation case 160 and the fermentation tank 112, and may further be located inside the fermentation case 160 to surround the fermentation tank 112. Accordingly, the temperature of the fermentation tank 112 may be maintained at a constant temperature. The insulation layer 171 may be formed of expanded polystyrene or polyurethane which is very insulative and may absorb vibrations.

The beverage maker may further include a temperature controller 11 configured to change the temperature inside the fermentation tank assembly 111; more specifically, inside the fermentation tank 112. The temperature controller 11 may heat or cool the temperature of the fermentation tank 112 to an optimum temperature of fermentation of the beverage. The temperature controller 11 may include a refrigeration cycle 13 having a compressor 131, a condenser 132, an expansion mechanism 133, and an evaporator 134; and any one of the condenser 132 and the evaporator 134 may be arranged in the fermentation tank 112. The beverage maker may further include a blower fan or blower 135 that dissipates heat of the temperature controller 11. The blower 135 may further cool the condenser 132.

When the condenser 132 is provided in the fermentation tank 112, the refrigeration cycle 13 may heat the fermentation tank 112 to adjust the temperature of the fermentation tank 112. In this case, the condenser 132 may contact an outer surface of the fermentation tank 112. The condenser 132 may include a condensation tube wound on the outer surface of the fermentation tank 112. When the evaporator 134 is provided in the fermentation tank 112, the refrigeration cycle 13 may cool the fermentation tank 112 to adjust the temperature of the fermentation tank 112. In this case, the evaporator 134 may contact an outer surface of the fermentation tank 112. The evaporator 134 may be an evaporation tube wound on the outer surface of the fermentation tank 112. The evaporator 134 may be provided between the fermentation tank 112 and the insulation layer 171, and may cool the fermentation tank 112 insulated by the insulation layer 171.

When the evaporator 134 is arranged in the fermentation tank 112, the temperature controller 11 may further include a heater 14 that may heat the fermentation tank 112. The heater 14 may contact an outer surface of the fermentation tank 112, and may be heated via electric power. The heater 14 may be configured as a line heater, and may be wound on the outer surface of the fermentation tank 112. The heater 14 may be provided below the evaporator 134. The evaporator 134 may be wound on an upper portion of the outer surface of the fermentation tank 112, and the heater 14 may be wound on a lower portion of the outer surface of the fermentation tank 112. Accordingly, fluid may naturally convect inside the fermentation tank 112 such that the internal temperature of the fermentation container 12 may become uniform.

The refrigeration cycle 13 may be configured as a heat pump. The refrigeration cycle 13 may include a refrigerant switch valve which may be a four-way valve. The refrigerant switch valve may be connected to a suction channel of the compressor 131 and a discharge channel of the compressor 131, may be connected to the condenser 132 through a condenser connecting channel, and may be connected to the evaporator 134 through an evaporator connecting channel.

When the fermentation tank 112 is cooled, the refrigerant switch valve may guide a refrigerant compressed by the compressor 131 to the condenser 132, and may guide the refrigerant discharged from the evaporator 134 to the compressor 131. When the fermentation tank 112 is heated, the refrigerant switch valve may guide the refrigerant compressed by the compressor 131 to the evaporator 134, and may guide the refrigerant discharged from the condenser 132 to the compressor 131 as well. The above-described configuration of the temperature controller 11 is merely an example, however, and the configuration of the temperature controller 11 may change as needed.

For example, the temperature controller 11 may include a thermoelectric module (TEM). The TEM may include a thermoelectric element, a heat dissipation plate which may be located outside the fermentation device 1, and a heat absorption plate which may be located inside the fermentation device 1. In this case, the blower 135 may face the heat dissipation plate and may function as a heat dissipation fan.

Materials and ingredients used in producing a beer, or beverage materials, may include water, malt, yeast, hops, and scent additives, as an example. The beverage maker may include both the material supplier 3 and the fermentation container 12, and the beverage materials or ingredients may be distributed and accommodated in the material supplier 3 and the fermentation container 12. Some beverage materials may be provided in the fermentation container 12, and other beverage materials may be provided in the material supplier 3. The beverage materials provided in the material supplier 3 may be provided together with water supplied from the water supplier 5. These beverage materials in the material supplier 3 may be supplied to the fermentation container 12, and may be mixed with the beverage materials provided in the fermentation container 12.

Main ingredients and necessary beverage materials may be provided in the fermentation container 12, and additives or secondary beverage materials added to these main beverage materials may be provided in the material supplier 3. Additives in the material supplier 3 may be supplied to the fermentation container 12, mixed with the water supplied from the water supplier 5, and may be further mixed with the main ingredients in the fermentation container 12.

The main ingredients in the fermentation container 12 may have a larger capacity than the additives. As an example, in the case of producing beer, the main ingredients may include malt, whereas the additives in the material supplier 3 may include yeast, hops, and scent additives.

The beverage maker may not include the material supplier 3 and may include the fermentation container 12. In this case, the main ingredients may be provided in the fermentation container 12, and a user may directly add any additives into the fermentation container 12. When the beverage maker includes both the material supplier 3 and the fermentation container 12, production of the beverage may be more simple as compared to the situation where only one of the materials supplier 3 or the fermentation container 12 is provided. However, embodiments disclosed herein are not limited to the example where both the material supplier 3 and the fermentation container 12 are included.

The beverage materials inside the fermentation container 12 may be fermented as time elapses, and the completed beverage inside the fermentation container 12 may flow through the main channel connector 115 to the main channel 4 and the beverage discharger 6, and may then be discharged. The main channel 4 may have one or a first end connected to the water supplier 5, and may have the other or a second end connected to the main channel connector 115 formed in the fermentation device 1. Also, an air injection channel 81 that guides the air pumped by the air injection pump 82 may be connected to the main channel 4.

The material supplier 3 may be connected to the main channel 4 such that the water or the air flowing through the main channel 4 may be introduced into the material supplier 3. Beverage materials may be accommodated in the material supplier 3, and the water supplied from the water supplier 5 or the air supplied from the air supplier 8 may pass through the material supplier 3. As an example, when the beverage produced by the beverage maker is beer, materials or ingredients provided in the material supplier 3 may include yeast, hops, and/or scent or flavor additives.

The beverage materials in the material supplier 3 may be directly provided in the material accommodating portions formed in the material supplier 3. At least one material accommodating portion may be formed in the material supplier 3. A plurality of material accommodating portions may also be formed in the material supplier 3. In this case, the plurality of material accommodating portions may be partitioned from each other. Beverage materials in the material supplier 3 may be provided in capsules C1, C2, and C3, and at least one capsule holder 31, 32, and 33 in which such capsules C1, C2, and C3 are held may be provided in the material supplier 3.

When the beverage materials are provided in the capsules C1, C2, and C3, in the material supplier 3, the capsules C1, C2, and C3 may be seated and withdrawn. The material supplier 3 may be configured as a capsule kit assembly in which the capsules C1, C2, and C3 are provided separately. The beverage materials contained in the material accommodating portion or the capsules C1, C2, and C3 may be extracted by hydraulic pressure of the water supplied from the water supplier 5 or by pneumatic pressure of the air injected from the air supplier 8.

When the beverage materials are extracted by the hydraulic pressure, the water supplied from the water supplier 5 to the main channel 4 may be mixed with the materials while passing through the material accommodating portion or the capsules C1, C2, and C3, and the beverage materials provided in the material accommodating portion or the capsules C1, C2, and C3 together with the water may flow to the main channel 4.

On the other hand, when the materials are extracted by the pneumatic pressure, the air supplied from the air supplier 8 to the material supplier 3 may push the materials while passing through the material accommodating portion or the capsules C1, C2, and C3, and the beverage materials provided in the material accommodating portion or the capsules C1, C2, and C3 together with the air may flow to the main channel 4.

A plurality of different kinds of additives may be provided in the material supplier 3 while being separated from each other. As an example, when beer is produced, the plurality of additives accommodated in the material supplier 3 may include yeast, hops, and/or scent or flavor additives, which may be separated from each other in the material supplier 3. Each of the material accommodating portions may be connected to the main channel 4, and the inlet module 3A or the outlet module 3B. When the plurality of capsule holders 31, 32, and 33 are formed in the material supplier 3, each of the capsule holders 31, 32, and 33 may be connected to the main channel 4, and the inlet module 3A or the outlet module 3B. The material accommodating portions of the material supplier 3 and the capsule holders 31, 32, and 33 of the material supplier 3 may have substantially the same configuration. When the capsules are inserted into the material supplier 3 in a state in which the beverage materials are in the capsules, the capsules may be named the capsule holders, and when the capsules are directly accommodated in the material supplier 3 in a state in which the beverage materials are not contained in the capsules, the beverage materials are provided in material accommodating portions. Since the material accommodating portions and the capsule holders have substantially the same configuration, for convenience of description, an example where the capsule holders are formed in the material supplier 3 will be described hereinafter.

The capsule holders 31, 32, and 33, in which the capsules C1, C2, and C3 containing beverage materials or additives may be detachably provided, may be connected to the main channel 4 and the inlet module 3A or the outlet module 3B. The inlet module 3A may include inlet channels 301, 311, 321, and 331 connecting the main channel 4 and the capsule holders 31, 32, and 33. The inlet module 3A may further include valves 313, 323, and 333 installed in the inlet channels 301, 311, 321, and 331. The valves 313, 323, and 333 may open and/or close the inlet channels 301, 311, 321, and 331. The outlet module 3B may include outlet channels 302, 312, 322, and 332 connecting the capsule holders 31, 32, and 33 and the main channel 4. The outlet module 3B may further include check valves 314, 324, and 334 installed in the outlet channels 302, 312, 322, and 332. The check valves 314, 324, and 334 may prevent the water or the air from flowing backward to the capsule holders 31, 32, and 33 through the outlet channels 302, 312, 322, and 332. The capsule holders 31, 32, and 33 may be separated from each other. The capsule holders 31, 32, and 33 may be connected to corresponding inlet channels 301, 321, and 332, and corresponding outlet channels 312, 322, and 332.

Hereinafter, a first additive, a second additive, and a third additive may be provided in the material supplier 3. The first additive may be yeast, the second additive may be hops, and the third additive may be scent additives, as an example. The material supplier 3 may include a first capsule holder 31 in which the first capsule C1 containing the first additive is provided, a second capsule holder 32 in which the second capsule C2 containing the second additive is provided, and a third capsule holder 33 in which the third capsule C3 containing the third additive is provided.

The first inlet channel 311 may be connected to the first capsule holder 31 such that it guides air or water to the first capsule holder 31, and the first outlet channel 312 may be connected to the first capsule holder 31 such that it guides water, a mixture of water and the first additive, and air from the first capsule holder 31. The first valve 313 may be installed in the first inlet channel 311 to open and/or close the first inlet channel 311. The first check valve 314 may be installed in the first outlet channel 312 such that it prevents discharged fluid from flowing backward to the first capsule holder 31 through the first outlet channel 312 while the fluid flows to the main channel 4. The fluid may be the water, the mixture of the water and the first additive, and the air, which are discharged from the first capsule holder 31. The second inlet channel 321 may be connected to the second capsule holder 32 such that it guides water or air into the second capsule holder 32, and the second output channel 322 may be connected to the second capsule holder 33 such that it guides fluid out of the second capsule holder. The second valve 323 may be installed in the second inlet channel 321. The second check valve 324 may be installed in the second outlet channel 322 such that it prevents discharged fluid from flowing backward to the second capsule holder 32. The third inlet channel 331 and the third output channel 332 may be connected to the third capsule holder 33. The third valve 333 may be installed in the third inlet channel 331 such that it opens and closes the third inlet channel 331, which guides water and air to the third capsule holder 33, and the third check valve 334 may be installed in the third outlet channel 332 such that it prevents discharged fluid from flowing back through the third outlet channel 332 into the third capsule holder 33. The fluid may be the water, the mixture of the water and the third additive, and the air, which are discharged from the third capsule holder 33.

Embodiments disclosed herein are not limited to a material supplier having only three capsules in which additives may be added. Embodiments may include four or n number of capsules Cn, wherein there would be four or n number of additives, valves $3n3$, inlet channels $3n1$, outlet channels $3n2$, and capsule holders $3n$.

When the beverage maker includes the material supplier 3, the main channel 4 may include a first main channel 4A located before the material supplier 3 in a flow direction of the water or the air, and a second main channel 4B located after the material supplier 3 in the flow direction of the water or the air. The main channel 4 may further include a bypass channel 4C connecting the first main channel 4A and the second main channel 4B and allowing the water or the air to bypass the material accommodating portions or the inlet module 3A and outlet module 3B of the material supplier 3. The bypass channel 4C may bypass the capsule holders 31, 32, and 33 of the material supplier 3.

The first main channel 4A may be connected to the water supplier 5, and the second main channel 4B may be connected to the fermentation device 1. Further, the bypass channel 4C may connect the first main channel 4A and the second main channel 4B, and at the same time, allow the water or the air to bypass the material supplier 3. The main channel 4 may be configured as one channel when the beverage maker does not include the material supplier 3, and may include the first main channel 4A, the second main channel 4B, and the bypass channel 4C when the beverage maker includes the material supplier 3. The bypass channel 4C may be connected in parallel to a channel of the first capsule holder 31, a channel of the second capsule holder 32, and a channel of the third capsule holder 33, The channel assembly 2 may further include a bypass valve 35 installed in the bypass channel 4C that opens and/or closes the bypass channel 4C.

The first main channel 4A may be connected to a common inlet channel 301 and the bypass channel 4C. The common inlet channel 301 may be connected to the first inlet channel 311, the second inlet channel 321, and the third inlet channel 331. The common inlet channel 301 may include a common pipe connected to the first main channel 4A, and a plurality of branching pipes branched from the common pipe and connected to the first inlet channel 311, the second inlet channel 321, and the third inlet channel 331, respectively. The second main channel 4B may be connected to a common outlet channel 302 and the bypass channel 4C. The common outlet channel 302 may be connected to the first outlet channel 312, the second outlet channel 322, and the third outlet channel 332. The common material supplier outlet channel 302 may include a common pipe connected to the second main channel 4B, and a plurality of joining pipes connecting the first outlet channel 312, the second outlet channel 322, and the third outlet channel 332 to the common pipe, respectively.

When the bypass valve 34 is closed, the water or the air supplied to the first main channel 4A may pass through the capsule holders 31, 32, and 33 instead of through the bypass channel 4C, and may flow to the second main channel 4B. In contrast, when the valves 311, 321, and 331 are closed, the water or the air supplied to the first main channel 4A may pass through the bypass channel 4C to bypass the capsule holders 31, 32, and 33, and may flow to the second main channel 4B.

The beverage maker may further include a water pump 52 that may pump water, and a water heater 53 that may heat the water pumped by the water pump 52. The water supplier 5 may further include a water tank outlet channel 54 connecting the water tank 51 and the water pump 52, and a water pump outlet channel 55 connecting the water pump 52 and the main channel 4. The water heater 53 may be installed in the water pump outlet channel 55. The water supplier 5 may further include a check valve 59 installed in the water pump outlet channel 55 to prevent the water from flowing backward to the water pump 52.

A flow meter 56 that measures a flow rate of the water pump outlet channel 55 may be installed in the water pump outlet channel 55. The flow meter 56 may be arranged after the check valve 59 along the flow direction of the water. The water heater 53 may be a mold heater, and may include a heater case through which the water pumped by the water pump 52 passes, and may also include a heater installed inside the heater case to heat the water introduced into the heater case, in an interior thereof. A thermal fuse 58 may be installed in the water heater 53. The terminal fuse 53 may interrupt a current applied to the water heater 53 as a circuit is cut off when a temperature is high.

The beverage maker may further include a thermistor 57 that measures a temperature of the water passing through the water heater 53. The thermistor 57 may be installed in the water heater 53. Alternatively, the thermistor 57 may be provided at a location of the water pump outlet channel 55 after the water heater 53 along the flow direction of the water. Also, the thermistor 57 may also be installed in the first main channel 4A.

When the water pump 52 is operated, the water in the water tank 51 may be guided to the water heater 53 through the water tank outlet channel 54, the water pump 52, and the water supplying pump outlet channel 55. The water guided to the water heater 53 may be guided to the main channel 4 after being heated by the water heater 53. Alternatively, the beverage maker may not include the water tank 51, the water pump 52, and the water heater 53. In this case, the water supplier 5 may be directly connected to a faucet or may be connected to the faucet through a separate connection hose that guides the water to the main channel 4. As another example, the beverage maker may exclude the water tank 51 and the water pump 52, but may still include the water heater 53. In this case, the water supplier 5 may be directly connected to a faucet or be connected to the faucet through a separate connection hose that guides the water to the main channel 4, and the water heater 53 may heat the water passing through the water supplier 5.

The beverage discharger 6 may be connected to the main channel 4. The beverage discharger 6 may include the beverage discharge channel 61, which is connected to the main channel 4 and to which the beverage of the main channel 4 is guided. The beverage discharger 6 may further include a dispenser 62 connected to the beverage discharge channel 61.

The beverage discharge channel 61 may be connected between the water supplier 5 and the fermentation device 1 in the main channel 4. The beverage discharge channel 61 may be connected between the material supplier 3 and the fermentation device 1 in the main channel 4. The beverage discharge channel 61 may be connected to the second main channel 4B. An anti-foamer 63 may be provided in the beverage discharge channel 61, and foam from the beverage flowing from the main channel 4 to the beverage discharge channel 61 may be minimized while passing through the anti-foamer 63. A mesh, for example, by which the foam is filtered may be provided in the anti-foamer 63. The dispenser 62 may include a tap valve having a lever 620 that the user manipulates and a limit switch 630 (or a micro switch 630, see FIG. 11) that detects manipulation by the user.

The gas discharger 7 may include a gas discharge channel 71 connected to the fermentation device 1, a pressure sensor 72 installed in the gas discharge channel 71, and a gas discharge valve 73 connected to the gas discharge channel 71 after the pressure sensor 72 in a gas discharging direction. The gas discharge channel 71 may be connected to the fermentation device 1; particularly, the gas discharge channel 71 may be connected to the fermentation lid 107. A gas discharge channel connector 121 to which the gas discharge channel 71 is connected may be provided in the fermentation device 1. The gas discharge channel connector 121 may be provided in the fermentation lid 107.

Gas in the fermentation container 12 may flow to the gas discharge channel 71 and the pressure sensor 72 through the gas discharge channel connector 121. The pressure sensor 72 may detect the pressure of the gas discharged from the fermentation container 12 via the gas discharge channel connector 121 to the gas discharge channel 71. The gas discharge valve 73 may be switched on and opened when air is injected into the fermentation container 12 by the air supplier 8. The beverage maker may inject the air into the fermentation container 12 to evenly mix beverage materials, such as malt, and the water. At this time, any foam generated in the fermentation container 12 may be discharged from an upper portion of the fermentation container 12 via the gas discharge channel 71 and the gas discharge valve 73 to the outside. The gas discharge valve 73 may be switched on and opened to detect a degree of fermentation during a fermentation process, and then may be switched off and closed. The gas discharger 7 may further include a gas relief valve 75 connected to the gas discharge channel 71. The gas relief valve 75 may be connected to the gas discharge channel 71 after the pressure sensor 72 in the gas discharging direction.

The air supplier 8 may inject air into the main channel 4. The air supplier 8 connect to the main channel 4 before the material supplier 3 in a water flowing direction, and in this case, may inject the air into the material supplier 3 through the main channel 4. The air supplier 8 may connect to the first main channel 4A. The air injected from the air supplier 8 to the main channel 4 may be injected into the fermentation container 12 after passing through the material supplier 3. The air injected from the air supplier 8 to the main channel 4 may also bypass the material supplier 3 to be injected into the fermentation container 12.

The air supplier 8 may inject the air into the capsule holders 31, 32, and 33 through the main channel 4, and residual water or dregs in the capsules C1, C2, and C3 or the capsule holders 31, 32, and 33 may flow to the main channel 4 by the air injected by the air supplier 8. The capsules C1, C2, and C3 and the capsule holders 31, 32, and 33 may be maintained clean by the air injected by the air supplier 8. The air supplier 8 may include the air injection channel 81 connecting the air injection pump 82 and the main channel 4. The air injection pump 82 may pump the air to the air injection channel 81. The air injection channel 81 may be connected between the water supplier 5 and the material supplier 3. The air injection channel 81 may be connected to the first main channel 4A of the main channel 4. The air supplier 8 may further include a check valve 83 configured to prevent the water guided to the main channel 4 from being introduced back into the air injection pump 82 through the air injection channel 81. The check valve 83 may be installed after the air injection pump 82 in an air injecting direction. In order to improve an output of the air injection pump 82, the air injection pump 82 may include a plurality of air pumps connected in parallel to each other. In this case, the air injection channel 81 may include a common pipe connected to the main channel 4, and a plurality of joining pipes connecting the plurality of air pumps to the common pipe, respectively.

The channel assembly 2 may include the main valve 9 that may open and/or close the main channel 4. The channel assembly 2 may further include a main check valve 94 installed in the main channel 4. The main channel 4 may include a first connector or first joint 91 connected to the beverage discharge channel 61, and a second connector or second joint 92 connected to the main channel connector 115 formed in the fermentation device 1. The main channel 4 may further include a third connector or third joint 93 connected to the outlet channels 302, 312, 322, and 332 in the material supplier 3. The main valve 9 may be installed between the first joint 91 and the second joint 92. The main check valve 94 may be installed between the first joint 91 and the third joint 93. The main check valve 94 may be installed in a direction in which the water, the air, or a mixture thereof may flow from the third joint 93 to the first connector 91.

When water is supplied to the fermentation container 12, the main valve 9 may be opened to open the main channel 4. While the fermentation tank 112 is cooled, the main valve 9 may be closed to close the main channel 4. When air is injected into the fermentation container 12, the main valve 9 may be opened to open the main channel 4. When additives or other secondary beverage materials are supplied into the fermentation container 12 from the material supplier 3, the main valve 9 may be opened to open the main channel 4. While the beverage materials are fermented in the fermentation container 12, the main valve 9 may be closed to seal the inside of the fermentation container 12. When the beverage is matured and stored, the main valve 9 may be closed to seal the inside of the fermentation container 12. When the beverage is discharged by the beverage discharger 6, the main valve 9 may be opened to open the main channel 4, and the beverage inside the fermentation container 12 may pass through the main valve 9 to flow to the beverage discharge channel 61. When the beverage is discharged by the beverage discharger 6, the main check valve 94 may prevent the beverage passing through the main valve 9 from flowing backward to the material supplier 3.

The beverage maker may include the air controlling channel assembly 15 which may supply the air into the fermentation tank 112 or discharge the air inside the fermentation tank 112. The air controlling channel assembly 15 may supply the air to the inner space S1 between the fermentation container 12 and the inner wall of the fermentation tank 112 or, in contrast, may discharge the air between the fermentation container 12 and the inner wall of the fermentation tank 112 to the outside. The air controlling channel assembly 15 may include an air supply channel 154 connected to the fermentation device 1, and an air discharge valve 156 connected to the air supply channel 154 that may discharge the air to the outside.

The air supply channel 154 may have one or a first end connected to the fermentation device 1, and the other or a second end connected to the air injection channel 81. The air supply channel 154 may further be connected to the fermentation lid 107. An air supply channel connector 117 to which the air supply channel 154 is connected may be provided in the fermentation device 1. The air supply channel connector 117 may further be provided in the fermentation case 160.

The air supply channel 154 may be connected to the air injection channel 81 of the air supplier 8. A connector 81a between the air supply channel 154 and the air injection channel 81 may be located after the check valve 83 in the air supplier 8 along a flow direction of the air passing through the air injection channel 81. In this case, the air pumped by the air injection pump 82 may sequentially pass through the air injection channel 81 and the air supply channel 154 and be guided to the space S1 between the fermentation container 12 and the inner wall of the fermentation tank 112. The air injection pump 82 and the air supply channel 154 may function as an air supplier that supplies air to the space S1 between the fermentation container 12 and the fermentation tank 112. On the other hand, a separate air pump may be connected to the air controlling channel assembly 15. In this case, the air supply channel 154 may be connected to the air pump without being connected to the air injection channel 81. However, air injecting pump 82 that both injects the air into the fermentation container 12 and supplies the air to the space S1 between the fermentation container 12 and the fermentation tank 112 is more cost-effective.

The air supply channel 154 and the air discharge valve 156 may function as an air discharging passage that discharges the air between the fermentation container 12 and the fermentation tank 112 to the outside. The air supply channel 154 may connect to the fermentation device 1 to supply the air to the space S1 between the fermentation tank 112 and the fermentation container 12.

In a state in which the fermentation container 12 is in the fermentation tank assembly 111, the air injection pump 82 and the air supply channel 154 may supply the air to the space S1 between the fermentation container 12 and the fermentation tank 112. In this way, the air supplied into the fermentation tank 112 may apply a pressure to the fermentation container 12. The beverage in the fermentation container 12 may be pressurized by the fermentation container 12 pressed by the air, and when the main valve 9 and the dispenser 62 are opened, the beverage may pass through the main channel connector 115 to flow to the main channel 4. The beverage flowing from the fermentation container 12 to the main channel 4 may be discharged to the outside through the beverage discharger 6.

When the beverage is completely produced and finished, the user or beverage maker may discharge the beverage inside the fermentation container 12 to the beverage discharger 6 in a state in which the fermentation container 12 is located inside the fermentation device 1 without being extracted to the outside of the fermentation device 1. The air injection pump 82 may supply the air to space S1 to form a predetermined pressure between the fermentation container 12 and the fermentation tank 112 by which the beverage inside the fermentation container 12 is easily discharged.

The air injection pump 82 may maintain an OFF state while the beverage is discharging, and may be driven or then stopped when the beverage is completely discharged. The air discharge valve 156 may be located outside the fermentation device 1. The air discharge valve 156 may be connected to a portion of the air supply channel 154, which may be located outside the fermentation tank 112. The air controlling channel assembly 15 may further include an air discharge channel 157 connecting the air discharge valve 156 and the air supply channel 154.

The air supply channel 154 may include a first channel extending from the connector 81a connected to the air injection channel 81 to a connector 154F connected to the air discharge channel 157, and a second channel extending from the connector 154F to the air supply channel connector 117. The first channel may be an air supply channel that may guide the air pumped by the air injection pump 82 to the second channel. Further, the second channel may act as an air supplying and air discharging combined channel that may supply air passing through the air supply channel to the space S1 between the fermentation tank 112 and the fermentation container 12, or may guide the air discharged from the space S1 between the fermentation tank 112 and the fermentation container 12 to the air discharge channel 157.

When the fermentation container 12 is expanded during beverage production, the air discharge valve 156 may be opened such that the air between the fermentation container 12 and the fermentation tank 112 is discharged to the outside. The air discharge valve 156 may be controlled to be opened when the water is supplied by the water supplier 5, and may be controlled to be opened when the air is injected by the air supplier 8.

When the beverage inside the fermentation container 12 is completely discharged, the air discharge valve 156 may be opened such that the air between the fermentation container 12 and the fermentation tank 112 is released to the outside. The user may withdraw the fermentation container 12 to the outside of the fermentation tank 112 after the beverage is completely discharged to prevent a situation where the fermentation tank 112 is maintained at a high pressure. The valve 156 may be controlled to be opened when the beverage inside the fermentation container 12 is completely discharged.

The air controlling channel assembly 15 may further include a relief valve 158 connected between the connector 154F and the fermentation device 1. The air controlling channel assembly 15 may also include an air supply valve 159 that may regulate the air pumped by the air injection pump 82 and supplied to the space S1 between the fermentation container 12 and the fermentation tank 112. The air supply valve 159 may be installed between the connector 81a of the air injection channel 81 and the connector 154F of the air discharge channel 157 in the air supply channel 154.

The air controlling channel assembly 15 may further include a check valve 155 installed in the air supply channel 154. The check valve 155 may be installed between the connector 81a of the air injection channel 81 and the connector 154F of the air discharge channel 157 in the air supply channel 154. The air check valve 155 may be arranged after the air supply valve 159 along the flow direction of the air guided from the air injection channel 81 to the air supply channel 154. The check valve 155 may prevent the air from flowing to the air injection channel 81 when the air between the fermentation container 12 and the fermentation tank 112 is discharged.

Meanwhile, the channel assembly 2 may further include a switch valve 20 installed in the main channel 4, which may be a four-way valve. The switch valve 20 may be arranged before the material supplier 3 with respect to a flow direction of the water flowing in the water supplier 5 or the air injected from the air supplier 8. The switch valve 20 may be installed in a connector of the first main channel 4A and the bypass channel 4C of the main channel 4. The air injection channel 81 and the inlet channels 301, 311, 321, and 331 in the material supplier 3 may be connected to the switch valve 20. The switch valve 20 may allow the first main channel 4A to communicate with the bypass channel 4C or the inlet channels 301, 311, 321, and 331. Also, the switch valve 20 may allow the air injection channel 81 to communicate with the inlet channels 301, 311, 321, and 331 or the bypass channel 4C.

When the switch valve 20 allows the first main channel 4A to communicate with the inlet channels 301, 311, 321, and 331, the water supplied from the water supplier 5 may be guided to the material supplier 3, and may pass through the capsule holders 31, 32, and 33 to flow to the second main channel 4B. When the switch valve 20 allows the first main channel 4A to communicate with the bypass channel 4C, the water supplied from the water supplier 5 may be guided to the bypass channel 4C, and may bypass the material supplier 3 to flow to the second main channel 4B. When the switch valve 20 allows the air injection channel 81 to communicate with the inlet channels 301, 311, 321, and 331, the air injected from the air supplier 8 may be guided to the material supplier 3, and may pass through the capsule holders 31, 32, and 33 to flow to the second main channel 4B. When the switch valve 20 allows the air injection channel 81 to communicate with the bypass channel 4C, the air injected from the air supplier 8 may be guided to the bypass channel 4C, and may bypass the material supplier 3 to flow to the second main channel 4B.

A temperature sensor 16 may be provided in the fermentation tank 112. The temperature sensor 16 may measure the temperature of the fermentation tank 112, and may transmit a temperature value to a controller 280 (see FIG. 3), which will be described hereinafter. The temperature sensor 16 may be fastened to a protrusion protruding downward from the bottom surface of the fermentation tank 112.

Figure 2:
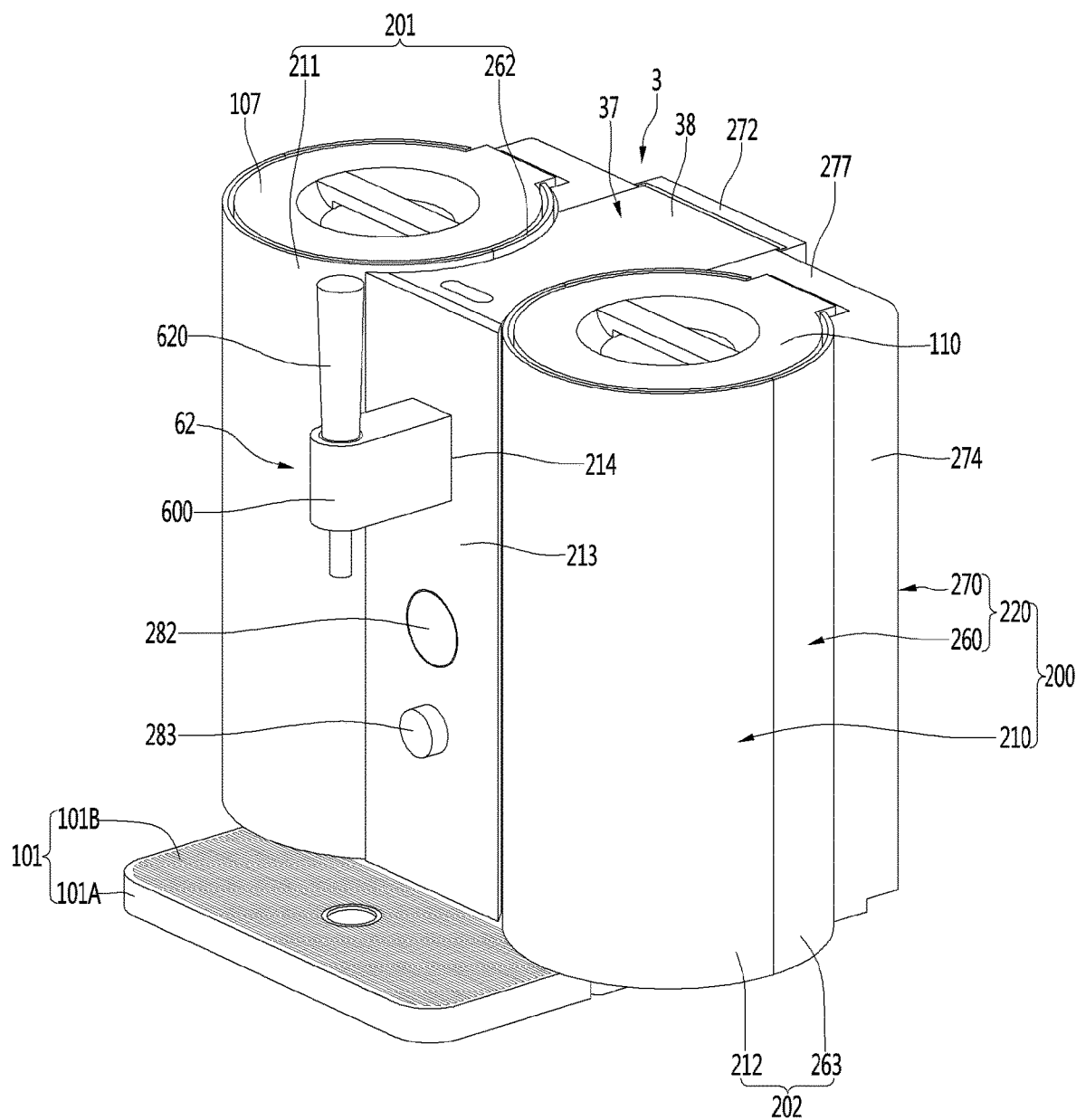
FIG. 2 is a perspective view illustrating a beverage maker according to an embodiment.
Figure 3:
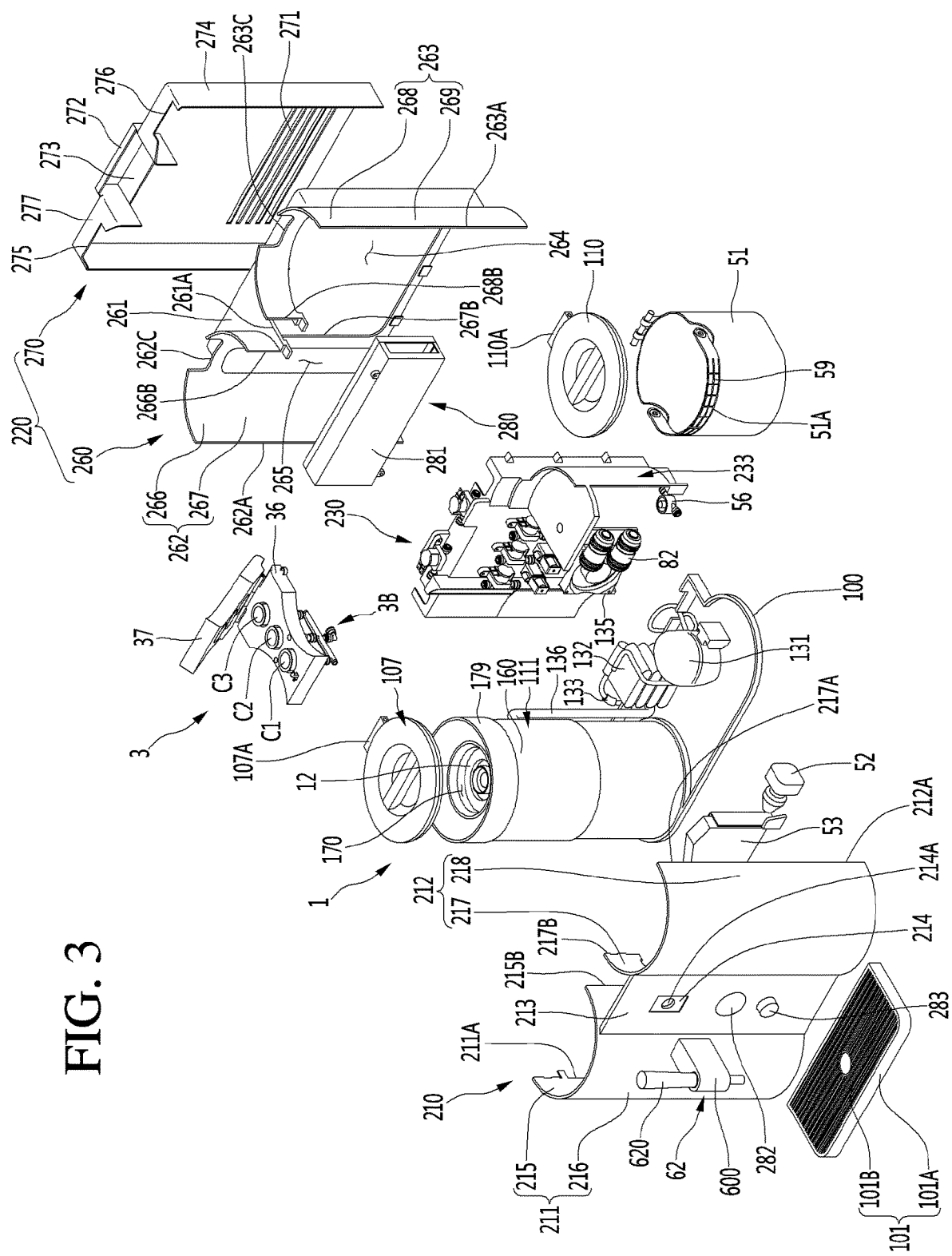
FIG. 3 is an exploded perspective view illustrating the beverage maker of FIG. 2.
Figure 4:
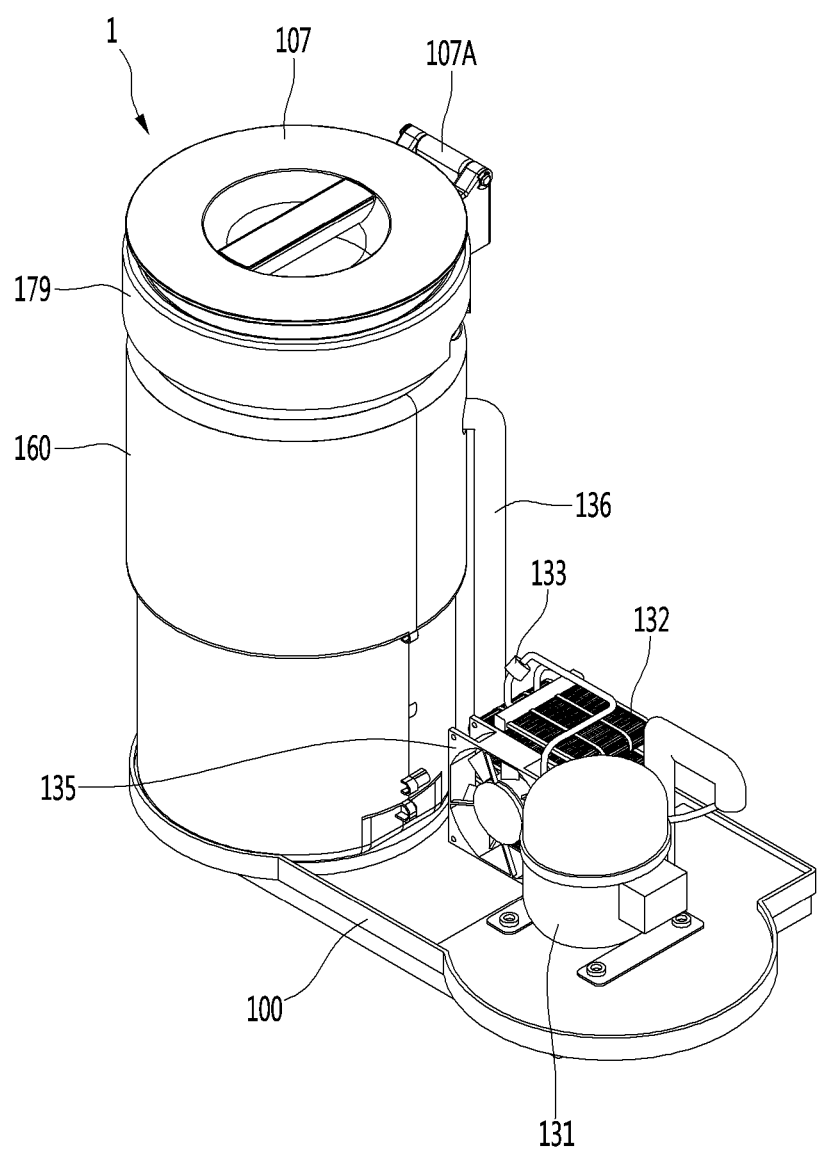
FIG. 4 is a perspective view illustrating a state in which a refrigeration cycle and a fermentation device are mounted on a base according to an embodiment of the present disclosure.
Figure 5:
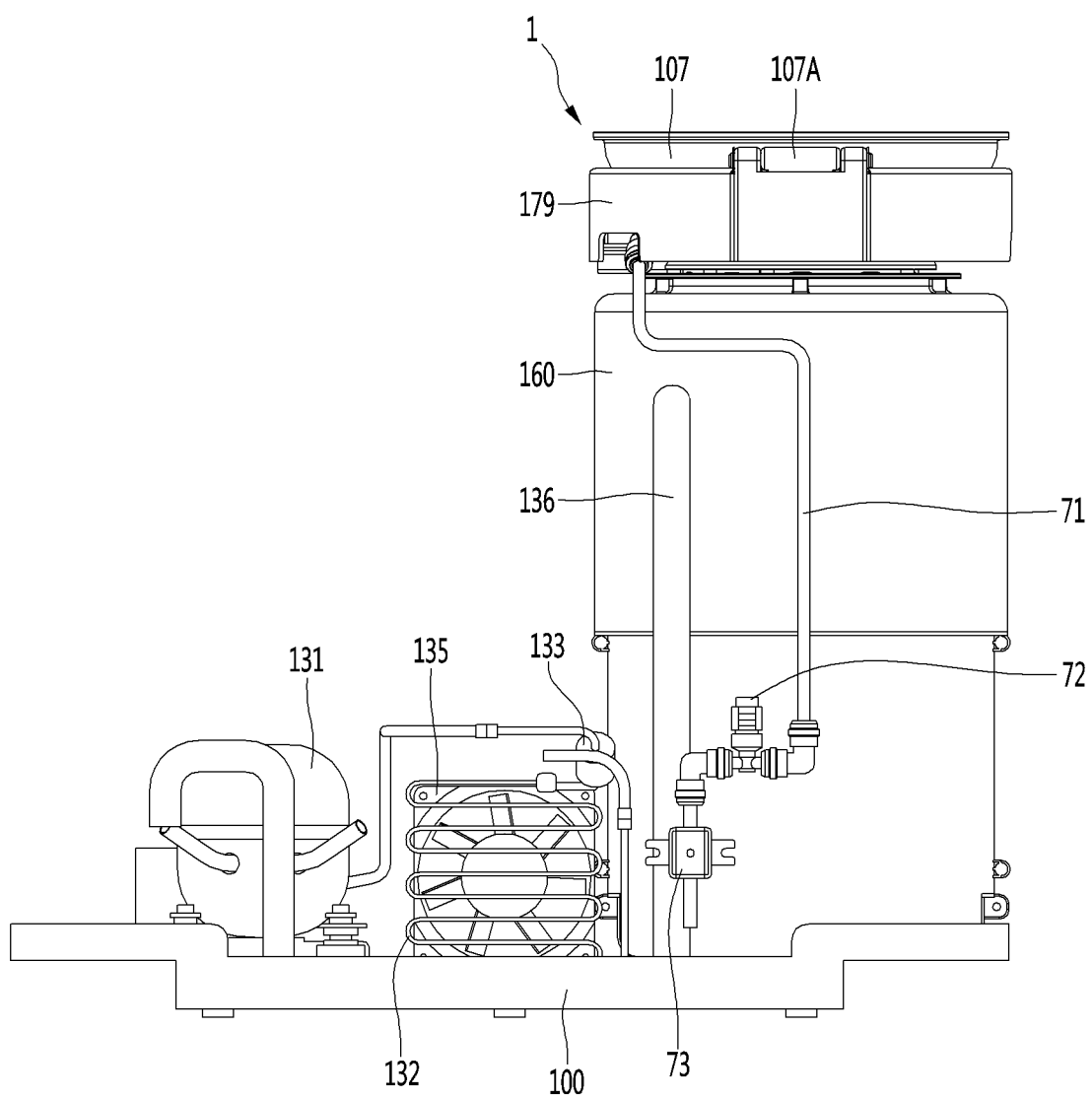
FIG. 5 is a rear view illustrating a state in which a refrigeration cycle and the fermentation device are mounted on a base according to an embodiment.

FIG. 2 is a perspective view illustrating the beverage maker according to an embodiment, FIG. 3 is an exploded perspective view illustrating the beverage maker of FIG. 2, FIG. 4 is a perspective view illustrating a state in which a refrigeration cycle and a fermentation device are mounted on a base according to an embodiment, and FIG. 5 is a rear view illustrating a state in which the refrigeration cycle and the fermentation device are mounted on the base according to an embodiment.

The beverage maker may include a base 100. The base 100 may constitute an outer appearance of the bottom surface of the beverage maker, and may support the fermentation device 1, the refrigeration cycle 13, the water heater 53, the water pump 52, a main frame 230, and other features which are located thereon. The beverage maker may further include a beverage container 101 that may receive and store the beverage or any fluid dropped from the dispenser 62. The beverage container 101 may be formed integrally with the base 100 or may be coupled to the base 100.

The beverage container 101 may include a body 101A having a space formed therein in which the beverage or liquid dropped from the dispenser 62 is accommodated. The beverage container 101 may include a plate 101B arranged on the upper surface of the body 101A to cover an internal space of the body 101A. The body 101A may protrude forward from a front portion of the base 100. The upper surface of the body 101A may be open. A plurality of holes through which the beverage is dropped into the body 101A may be formed in the plate 101B. Any liquid dropped from the dispenser 62 may be dropped onto the plate 101B, and may be temporarily stored inside the beverage container 101 through a hole of the plate 101B, and a vicinity of the beverage maker may be maintained clean.

The fermentation device 1 may have an approximately cylindrical shape. The fermentation device 1 may be supported from the lower side by the base 100. The fermentation device 1 may be provided in the base 100. The fermentation device 1 may be directly seated and arranged in the base 100, and may be supported by a separate fermentation device supporter seated on the base 100 and be arranged in the base 100. The fermentation device 1 may include the fermentation tank assembly 111 having the opening 170 formed therein, and the fermentation lid 107 that may cover the opening 170. As described above, the fermentation container 12 may be arranged inside the fermentation tank assembly 111.

The fermentation tank 112 may be provided inside the fermentation case 160. The insulation layer 171 may be located between the fermentation tank 112 and the fermentation case 160 and may insulate the fermentation tank 112. The evaporator 134 (see FIG. 1) and/or the heater 14 (see FIG. 1) wound on the fermentation tank 112 may be located between the insulation layer 171 and the fermentation tank 112. That is, the insulation layer 171 may surround the evaporator 134 and/or the heater 14 together with the fermentation tank 112, thereby facilitating control of the temperature of the fermentation tank 112.

The fermentation lid 107 may be arranged above the fermentation tank assembly 111, and may open and/or close the opening 170 of the fermentation tank assembly 111 on an upper side thereof. The fermentation tank assembly 111 may further include a lid body 179 on which the fermentation lid 107 is seated. The lid body 179 may be provided above the fermentation case 160, and may support the fermentation lid 107 on a lower side thereof. The fermentation case 160 may constitute a partial outer appearance of a lower portion of the fermentation device 1, and the fermentation lid 107 may constitute a partial outer appearance of an upper portion of the fermentation device 1. The fermentation case 160 may be seated on the base 100. The fermentation lid 107 may be detachably, slidably, or rotatably connected to the fermentation tank assembly 111. As an example, the fermentation lid 107 may be hinged to the lid body 179. A first hinge 107A protruding rearward may be provided in the fermentation lid 107, and may be hinged to the lid body 179.

A water tank 51 may be provided above the base 100, and may be vertically spaced apart from the base 100 by a water tank supporter 233. The water tank 51 may be transversely spaced apart from the fermentation device 1 in a lateral or left-right or lateral direction. An upper surface of the water tank 51 may be open. A front surface and a rear surface of the water tank 51 may be a transversely rounded curved surface, and opposite surfaces, or top and bottom surfaces, of the water tank 51 may be a flat surface. A curvature of the front surface and the rear surface of the water tank 51 may be the same as a curvature of an outer circumferential surface of the fermentation device 1. However, embodiments disclosed herein are not limited thereto, and the shape of the water tank 51 may change as needed. As an example, the upper surface of the water tank 51 may be formed in a top-open hollow cylindrical shape.

A water tank handle 59 may be provided in and rotatably connected to the water tank 51. Opposite ends of the water tank handle 59 may be hinged to the opposite surfaces of the water tank 51. In a state in which the water tank handle 59 is rotated upward, the user may lift up the water tank 51 while holding the water tank handle 59. A stepped portion 51a may be formed at an upper end of the water tank 51. The stepped portion 51a may be a portion having a lower height than the other upper end as a part of the upper end of the water tank 51 is stepped. The stepped portion 51a may be a part of a front portion of the upper end of the water tank 51. The water tank handle 59 may be in contact with the stepped portion 51a. The width of the water tank handle 59 may be the same as a step height of the stepped portion 51a. Further, the water tank handle 59 may include a bent portion, and the curvature of the bent portion may be the same as the curvature of the front surface of the water tank 51.

The beverage maker may further include a water tank lid 110 that covers the open upper surface of the water tank 51. The water tank lid 110 may open and/or close an inner space of the water tank 51. The water tank lid 110 may be rotatably connected to the water tank 51. A second hinge 110A protruding rearward may be provided in the water tank lid 110, and may be hinged to the water tank 51. The water tank lid 110 may be formed to have the same shape as that of the fermentation lid 107, which may give the beverage maker a sense of unity in terms of design, and the same component may be advantageously utilized as the water tank lid 110 and the fermentation lid 107. Additionally, a height between the base 100 and the fermentation lid 107 may be the same as a height between the base 100 and the water tank lid 110. Further, a height between the base 100 and the upper surface of the fermentation lid 107 may be the same as a height between the base 100 and the upper surface of the water tank lid 110.

The beverage maker may further include an outer case 200. The outer case 200 may be seated on the base 100 and may define an outer appearance of the beverage maker. The outer case 200 may include a fermentation device cover 201 that covers the fermentation device 1 and a water tank cover 202 that covers the water tank 51. The fermentation device cover 201 and the water tank cover 202 may have a hollow cylindrical shape. Parts or portions of the circumferential surfaces of the fermentation device cover 201 and the water tank cover 202 may be open. At least portions of the outer circumferences of the fermentation device 1 and the water tank 51 may be surrounded by the covers 201 and 202. That is, the fermentation device 1 may be arranged inside the fermentation device cover 201, and the water tank 51 may be arranged inside the water tank cover 202.

The fermentation device cover 201 and the water tank cover 202 may fix the fermentation device 1 and the water tank 51, and may protect the fermentation device 1 and the water tank 51 from external impacts. The curvature of the fermentation device cover 201 may be the same as that of the outer circumference of the fermentation device 1, and the curvature of the water tank cover 202 may be the same as the curvature of the front surface and the rear surface of the water tank 51. The height of the fermentation device cover 201 may be larger than the height of the fermentation case 160. The fermentation device cover 201 and the water tank cover 202 may be transversely spaced apart from each other. The heights and/or the diameters of the fermentation device cover 201 and the water tank cover 202 may be equal to each other to provide a symmetric structure and uniform outer appearance of the beverage maker.

At least one of the main frame 230, the water pump 52, the water heater 53, the air injection pump 82, or the temperature controller 11 may be provided in the outer case 200. In addition, at least a part of the channel assembly 2 may be located inside the outer case 200. The outer case 200 may include a front or first cover 210 and a rear or second cover 220. The front cover 210 may be arranged in front of the fermentation device 1, the water tank 51, and the main frame 230; and the rear cover 220 may be arranged behind the fermentation device 1, the water tank 51, and the main frame 230. The front cover 210 may constitute a partial outer appearance of a front portion of the beverage maker.

The dispenser 62 may be mounted on the front cover 210. The dispenser 62 may be closer to an upper end than a lower end of the front cover 210. The dispenser 62 may be located above the beverage container 101. The user may discharge the beverage by opening the dispenser 62. The front cover 210 may include a front fermentation device cover 211, a front water tank cover 212, and a center cover 213. The front fermentation device cover 211 may cover a part of a front portion of the outer circumference of the fermentation device 1. The front fermentation device cover 211 may correspond to a part of a front portion of the fermentation device cover 201. The front fermentation device cover 211 may include an upper front cover 215 and a lower front cover 216. The upper front cover 215 and the lower front cover 216 may be formed integrally. The upper front cover 215 may cover a part of a front portion of an outer circumference of the fermentation lid 107, and the lower front cover 216 may cover a part of a front portion of an outer circumference of the fermentation case 160.

A circumferential length of the upper front cover 215 may be larger than a circumferential length of the lower front cover 216. An outer end of the lower front cover 216 and an outer end of the upper front cover 215 may coincide with each other with respect to a circumferential direction of the front fermentation device cover 211. The outer end of the lower front cover 216 and the outer end of the upper front cover 215 together may form an outer end 211A of the front fermentation device cover 211. A front-rear distance between an inner end of the lower front cover 216 and the center cover 213 may be smaller than a frontward-rearward distance between an inner end 215b of the upper front cover 215 and the center cover 213.

The front fermentation device cover 211 may constitute the fermentation device cover 201 together with a rear fermentation device cover 262 of a rear cover 220. That is, the fermentation device cover 201 may include the front fermentation device cover 211 and the rear fermentation device cover 262. The front fermentation device cover 211 and the rear fermentation device cover 262 may be fastened to each other. The rear fermentation device cover 262 may cover a part of a rear portion of the fermentation device 1. The rear fermentation device cover 262 may correspond to a part of a rear portion of the fermentation device cover 201. The rear fermentation device cover 262 may be located behind the front fermentation device cover 211. The rear fermentation device cover 262 may include an upper rear cover 266 and a lower rear cover 267. The upper rear cover 266 and the lower rear cover 267 may be formed integrally. The upper rear cover 266 may cover a part of a rear portion of the outer circumference of the fermentation lid 107, and the lower rear cover 267 may cover a part of a rear portion of the outer circumference of the fermentation case 160.

A circumferential length of the upper rear cover 266 may be larger than a circumferential length of the lower rear cover 267. An outer end of the lower rear cover 267 and an outer end of the upper rear cover 266 may coincide with each other with respect to a circumferential direction of the rear fermentation device cover 262. The outer end of the lower rear cover 267 and the outer end of the upper rear cover 266 together may form an outer end 262A of the rear fermentation device cover 262. The outer end 262A of the rear fermentation device cover 262 may be in contact with the outer end 211A of the front fermentation device cover 211.

An inner end 266B of the upper rear cover 266 of the rear fermentation device cover 262 may be in contact with an inner end 215B of the upper front cover 215 of the front fermentation device cover 211. On the other hand, an inner end 267B of the lower rear cover 267 may be spaced apart from the inner end of the lower front fermentation device cover 216.

The front water tank cover 212 may cover the front surface of the water tank 51. The front water tank cover 212 may correspond to a part of a front portion of the water tank cover 202. The front water tank cover 212 may include an upper front cover 217 and a lower front cover 218. The upper front cover 217 and the lower front cover 218 may be formed integrally. The upper front cover 217 may cover a part of an upper portion of the front surface of the water tank 51 and the water tank handle 59. The lower front cover 218 may cover a part of a lower portion of the front surface of the water tank 51. A circumferential length of the upper front cover 217 may be larger than a circumferential length of the lower front cover 218. An outer end of the lower front cover 218 and an outer end of the upper cover 217 may coincide with each other with respect to a circumferential direction of the front water tank cover 212. The outer end of the lower front cover 218 and the outer end of the upper front cover 217 together may form an outer end 212A of the front water tank cover 212.

A frontward-rearward distance between an inner end of the lower front cover 218 and the center cover 213 may be smaller than a frontward-rearward distance between an inner end 217B of the upper front cover 217 and the center cover 213. The front water tank cover 212 may constitute the water tank cover 202 together with a rear water tank cover 263 of the rear cover 220. That is, the water tank cover 202 may include the front water tank cover 212 and the rear water tank cover 263. The front water tank cover 212 and the rear water tank cover 263 may be fastened to each other.

The rear water tank cover 263 may cover a part of a rear portion of the outer circumference of the water tank 51. The rear water tank cover 263 may be located behind the front water tank cover 212. The rear water tank cover 263 may include an upper rear cover 268 and a lower rear cover 269. The upper rear cover 268 and the lower rear cover 269 may be formed integrally. The upper rear cover 268 may cover a part of an upper portion of the rear surface of the water tank 51, and the lower rear cover 269 may cover a part of a lower portion of the rear surface of the water tank 51.

A circumferential length of the upper rear cover 268 may be larger than a circumferential length of the lower rear cover 269. An outer end of the lower rear water cover 267 and an outer end of the upper rear cover 268 may coincide with each other with respect to a circumferential direction of the rear water tank cover 263. The outer end of the lower rear cover 269 and the outer end of the upper rear cover 268 together may form an outer end 263A of the rear water tank cover 263. The outer end 263A of the rear water tank cover 263 may be in contact with the outer end 212A of the front water tank cover 212. An inner end 268B of the upper rear cover 268 may be in contact with an inner end 217B of the upper front cover 217 of the front water tank cover 212. On the other hand, an inner end of the lower rear cover 269 may be spaced apart from an inner end of the lower front cover 218 of the front water tank cover 212.

The center cover 213 may be arranged between the front fermentation device cover 211 and the front water tank cover 212. Opposite ends of the center cover 213 may be in contact with the front fermentation device cover 211 and the front water tank cover 212, respectively. The center cover 213 may have a vertically arranged flat plate shape. The height of the center cover 213 may be the same as the heights of the front fermentation device cover 211 and the front water tank cover 212.

A discharge valve mount 214 on which the dispenser 62 is mounted may be provided in the center cover 213. A valve body 600 of the dispenser 62 may be mounted on the discharge valve mount 214. The discharge valve mount 214 may be a portion of the front surface of the center cover 213 that is recessed rearward. The discharge valve mount 214 may be closer to an upper end than a lower end of the center cover 213. A through-hole 214A open in a frontward-rearward direction may be provided in the discharge valve mount 214. The beverage discharge channel 61 may pass through the through-hole 214A and may be connected to the dispenser 62.

The beverage maker may include a display 282 that may display various kinds of information of the beverage maker. The display 282 may be arranged in the center cover 213. The display 282 may be provided at a position of the center cover 213 which is not covered by the dispenser 62. That is, the display 282 may not transversely overlap with the dispenser 62. The display 282 may include a display element such as a liquid crystal display (LCD), a light emitting diode (LED), and an organic light emitting diode (OLED), for example. The display 282 may include a display printed circuit board (PCB) in which the display element is installed. The display PCB may be electrically connected to the controller 280.

The beverage maker may include an input that may receive a command related to manufacturing or producing a beverage in the beverage maker. The input may include a rotary knob 283. The rotary knob 283 may be arranged in the center cover 213 below the display 282. The input may further include a touch screen that may receive a command of the user in a touch manner. The touch screen may be provided in the display 282. The input may be electrically connected to the controller 280, which will be described hereinafter. A user may also input a command through a remote controller or a wireless communication device, and the controller 280 may receive the command of the user through a wireless communication element.

The rear cover 220 may be arranged behind the fermentation device 1, the water tank 51, and the main frame 230. The rear cover 220 may be coupled to the front cover 210, and an inner space of the outer case 200 may be formed between the rear cover 220 and the front cover 210. The rear cover 220 may be provided on the base 100, and may have the same height as the front cover 210. The rear cover 220 may include a first rear cover 260 and a second rear cover 270. The first rear cover 260 may be provided on the base 100, and the second rear cover 270 may be mounted on the first rear cover 260.

A cover through-hole 264 open in the frontward-rearward direction may be provided in the first rear cover 260 or in a cover body 261. The cover through-hole 264 may face the main frame 230 in the frontward-rearward direction. Accordingly, the user may access an inside of the beverage maker even while the first rear cover 260 is not separated. The first rear cover 260 may include the cover body 261, the rear fermentation device cover 262, and the rear water tank cover 263. As described above, the rear fermentation device cover 262 and the front fermentation device cover 211 may constitute the fermentation device cover 201, and the rear water tank cover 263 and the front water tank cover 212 may constitute the water tank cover 202. The rear fermentation device cover 262 and the rear water tank cover 263 may be provided in contact with the cover body 261. At least a portion of the cover body 261 may be located behind the rear fermentation device cover 262 and the rear water tank cover 263. The rear fermentation device cover 262 and the rear water tank cover 263 may be mounted on a front side of the cover body 261.

A fermentation device cover seated portion that is recessed rearward in a portion of the upper surface of the cover body 261 may be provided in the cover body 261. The upper rear cover 266 of the rear fermentation device cover 262 may be in contact with an inner circumferential surface of the fermentation device cover seated portion. A water tank cover seated portion that is recessed rearward in a portion of the upper surface of the cover body 261 may be provided in the cover body 261. The upper rear cover 268 of the rear water tank cover 263 may be in contact with an inner circumferential surface of the water tank cover seated portion.

Hinge grooves or hinge fixing grooves 262C and 263C may be provided at upper ends of the rear fermentation device cover 262 and the rear water tank cover 263, respectively. The first hinge 107A formed in the fermentation lid 107 may be fitted in and fixed to the first hinge groove 262C formed in the rear fermentation device cover 262. The second hinge 110A formed in the water tank lid 110 may be fitted in and fixed to the second hinge groove 263C formed in the rear water tank cover 263. The heights of the upper rear cover 266 of the rear fermentation device cover 262 and the upper rear cover 268 of the rear water tank cover 263 may be the same as the height of the material supplier 3.

A pipe hole 265 may be provided in the rear fermentation device cover 262. The pipe hole 265 may extend vertically and may be open in the frontward-rearward direction. A cooling pipe 136 may be connected to the fermentation device 1. A refrigerant channel constituting the refrigeration cycle 13 (see FIG. 1) may be arranged in the cooling pipe 136. The refrigerant channel connecting the expansion mechanism 133 and the evaporator 134 (see FIG. 1) may be provided in the cooling pipe 136. The cooling pipe 136 may be connected to a rear portion of the fermentation device 1 and may be provided in the pipe hole 265 formed in the rear fermentation device cover 262.

The cover body 261 may support the material supplier 3. At least a part of the material supplier 3 may be provided on the upper surface of the cover body 261, and the cover body 261 may support the material supplier 3 on the rear side thereof. An outlet groove 261A may be formed in the cover body 261. The outlet groove 261A may be recessed rearward in a portion of a front end of an upper portion of the cover body 261. The outlet module 3B may be connected to a lower portion of the material supplier 3, and may extend to the inner space of the outer case 200 through the outlet groove 261A. The second rear cover 270 may be mounted on a rear side of the first rear cover 260. The second rear cover 270 may cover at least a portion of the cover through-hole 264 formed in the first rear cover 260. The second rear cover 270 may be mounted on the cover body 261 of the first rear cover 260. A size of the second rear cover 270 may be larger than a size of the cover body 260. A side surface 274 of the second rear cover 270 may surround a side surface of the cover body 261 from the outside, and an upper surface 277 of the second rear cover 270 may be located above the upper surface of the cover body 261.

At least one through-hole 271 may be formed in the rear cover 220. The at least one through-hole 271 may be formed in the second rear cover 270. The through-hole 271 may face the cover through-hole 264 formed in the first rear cover 260 in a front-rear direction. The blower 135 may face the cover through-hole 264 and the through-hole 271 in the frontward-rearward direction, and the condenser 132 may be positioned between the blower 135 and the through-hole 271. Air heat-exchanged in the condenser 132 by the blower 135 may sequentially pass through the cover through-hole 264 and the through-hole 271, and may be discharged to the outside of the outer case 200. Gas discharged through the gas discharge valve 73 (see FIG. 1) may also be discharged to the outside of the beverage maker through the through-hole 271.

At least one of a material supplier cover 272 and a material supplier support 273 may be formed in the second rear cover 270. The material supplier cover 272 may recess rearward in a portion of the front surface of the second rear cover 270 and may cover the rear surface of the material supplier 3. Accordingly, the beverage maker may be more compact in the frontward-rearward direction than a beverage maker where the material supplier cover 272 is not recessed. The material supplier support 273 may be recessed in a downward direction in a portion of the upper surface of the second rear cover 270. The height of the material supplier support 273 may be the same as the height of the upper surface of the cover body 261. A part of a rear portion of the material supplier 3 may be provided on the material supplier support 273, and the material supplier support 273 may support the material supplier 3 on a lower side thereof.

The material supplier cover 272 and the material supplier support 273 may together form a material supplier holder, and a part of the rear portion of the material supplier 3 may be provided in the material supplier holder. A left-right or lateral width of the material supplier cover 272 and the material supplier support 273 may be the same as a left-right or lateral width of the material supplier 3.

At least one hinge groove 275 and/or 276 may be formed in the second rear cover 270. A first hinge groove 275 in which the first hinge 107A is provided and a second hinge groove 276 in which the second hinge 110A is provided may be formed in the second rear cover 270. The first hinge groove 275 may correspond to a first hinge fixing groove 262C formed in the rear fermentation device cover 262, and the second hinge groove 276 may correspond to a second hinge fixing groove 263C formed in the rear water tank cover 263. A beverage maker having hinge grooves 275 and 276 may become compact in a front-rear direction than a beverage maker without these hinge grooves. Additionally, the material supplier 3 may be provided between the fermentation device 1 and the water tank 51, further allowing the beverage maker to be manufactured more compactly as compared to a case where the material supplier 3 is not located between the fermentation device 1 and the water tank 51. This configuration also allows the fermentation device 1 and the water tank 51 to protect the material supplier 3.

The material supplier 3 may have one or a first side in contact with the fermentation device 1 and another or a second side in contact with the water tank 51. At least parts of opposite surfaces of the material supplier 3 may be formed in a curved surface, and the curved surface may contact an outer circumference of the fermentation device cover 201 and an outer circumference of the water tank cover 202. The material supplier 3 may be provided above the base 100 and may be vertically spaced apart from the base 100. The material supplier 3 may further be located above the main frame 230. That is, the main frame 230 may be vertically positioned between the base 100 and the material supplier 3.

The material supplier 3 may be positioned between the front cover 210 and the rear cover 220 in the frontward-rearward direction. The front surface of the material supplier 3 may be covered by the center cover 213 of the front cover 210, and the rear surface of the material supplier 3 may be covered by the material supplier cover 272 of the second rear cover 270. The material supplier 3 may be provided on the rear cover 220. The material supplier 3 may be supported by the cover body 261 of the first rear cover 261 and the material supplier support 273 of the second rear cover 270. The outlet module 3B connected to the material supplier 3 may be arranged to pass through the outlet groove 261A of the cover body 261.

The material supplier 3 may include a capsule body 36, which may include the capsule holders 31, 32, and 33 provided therein in which the capsules C1, C2, and C3 are detachably provided, and the material supplier 3 may further include a lid 37 covering the capsule holders 31, 32, and 33. The capsule body 36 may be supported by the cover body 261 of the first rear cover 261 and the material supplier support 273 of the second rear cover 270. The lid 37 may include a lid top 38 covering the capsule body 36. The lid top 38 may be slidably arranged in or rotatably connected to the capsule body 36. The lid top 38 may be hinged to the capsule body 36. The material supplier 3 may be installed at an approximately central upper portion of the beverage maker, and the user may easily mount and separate the capsules C1, C2, and C3 by upwardly rotating the lid 37 of the material supplier 3.

The beverage maker may include the main frame 230 on which at least a part of the channel assembly 2 is mounted. The main frame 230 may be located between the front cover 210 and the rear cover 220 in a front-rear direction. At least a portion of the main frame 230 may be located behind the fermentation device 1 and the water tank 51. The main frame 230 may be provided on the base 100 below the material supplier 3. The main frame 230 may include the water tank supporter 233, and the water tank support 233 may space the water tank 51 apart from the base 100 in a vertical direction.

At least one of the water pump 52, the water heater 53, the blower 135, and the air injection pump 82 may be mounted on the main frame 230. Hereinafter, a case where the blower 135 and the air injection pump 82 are mounted on the main frame 230 will be described. The controller 280 may be mounted on the main frame 230. At least a portion of the main frame 230 may be located between the condenser 132 and the fermentation device 1. This positioning helps to maintain a temperature of the fermentation device 1, as the main frame 230 may protect the fermentation device 1 from heat emitted by the condenser 132. The water heater 53, the water pump 52, the compressor 131, and the condenser 132 may be mounted and supported on the base 100. At least one of the water heater 53 and the water pump 52 may be arranged in front of the main frame 230. The compressor 131 may be vertically positioned between the base 100 and the water tank 51. The compressor 131 may further be positioned between the water tank support 233 and the fermentation device 1 in the left-right or lateral direction. The compressor 131 may be spaced apart from the fermentation device 1 in a left-right or lateral direction. The front surface of the blower 135 may be directed between the fermentation device 1 and the compressor 131. Also, the rear surface of the blower 135 may be directed to the condenser 132. That is, the blower 135 may be arranged in front of the condenser 132 such that the condenser 132, arranged behind the blower 135, may face the blower 135 mounted on the main frame 230. The condenser 132 may further be arranged between the blower 135 and the through-hole 271 formed in the rear cover 220. That is, the through-hole 271 may be located behind the condenser 132. Accordingly, air may be suctioned to the front surface of the blower 135 through a space between the fermentation device 1 and the compressor 131, may be blown to the rear surface of the blower 135, and may be discharged to the through-hole 271 formed in the rear cover 220 through the condenser 132. At least a portion of the blower 135 may be located between the fermentation device 1 and the compressor 131, making the beverage maker more compact in a front-rear direction.

The gas discharger 7 may be connected to the fermentation device 1, and may discharge gas inside the fermentation device 1. The gas discharge channel 71 may be connected to the fermentation device 1, and gas may be discharged from the gas discharge valve 73 connected to the gas discharge channel 71. The gas discharge valve 73 may be located behind the fermentation device 1. Accordingly, noise generated while the gas is discharged from the gas discharge valve 73 may be blocked or muffled by the fermentation device 1, so that noise heard from a front side of the beverage maker may be reduced. The gas discharged from the gas discharge valve 73 may also be discharged through the through-hole 271 formed in the rear cover 220. That is, both the air blown by the blower 135 and the gas discharged from the gas discharge valve 73 may be discharged through the same surface through the through-hole 271 formed in the rear cover 220. Accordingly, a structure of the beverage maker may become simple, and manufacturing costs may be reduced.

The beverage maker may further include the controller 280 configured to control the beverage maker. The controller 280 may be an electronic device detachably mounted on the main frame 230. The controller 280 may include a main printed circuit board (PCB) and a PCB case 281 in which the main PCB is embedded. The controller 280 may further include a wireless communication device such as a remote controller or a portable terminal and a wireless communication element that performs wireless communication. The wireless communication element may be installed and is not limited to certain types of wireless communication elements as long as the wireless communication element may wirelessly communicate with the remote controller or the wireless communication device, much like Wi-Fi or Bluetooth technology.

The controller 280 may receive a command by the user using an input unit or device. For example, the controller 280 may produce the beverage according to a command input by the rotary knob 283. Also, the controller 280 may output various kinds of information of the beverage maker to the display 282. For example, the controller 280 may convey, through the display 282, information on an amount of the discharged beverage, a residual amount of the beverage, and whether the beverage is completely discharged.

The controller 280 may control at least one of the channel assembly 2, the water pump 52, the water heater 53, the air injection pump 82, and the temperature controller 11. The controller 280 may be arranged in the main frame 230 and may further be fastened to a rear portion of the main frame 230. The PCB case 281 may be fastened to the main frame 230, and may safely protect the main PCB therein. At least a part of the controller 280 may face the cover through-hole 264 formed in the first rear cover 260.

The controller 280 may detect a pressure inside the fermentation container 12 by the pressure sensor 72, and may detect a temperature of the fermentation tank 112 by the temperature sensor 16. The controller 280 may determine a degree to which the beverage is fermented using the detected pressure or the detected temperature. The controller 280 may detect a temperature of the water supplied from the water supplier 5 to the main channel 4 by the thermistor 57, and may control the water heater 53 according to the detected temperature of the water. The controller 280 may control the temperature controller 1 to maintain the temperature of the fermentation tank 112 at a designated or proper temperature.

The controller 280 may integrate at least one of a time at which a limit switch 630 is switched on, a time at which the air injection pump 82 is driven, and a time at which the main valve 9 is switched on after beverage production is complete. The controller 280 may calculate an amount of the beverage discharged from the fermentation container 12 according to the integrated time. The controller 280 may calculate the residual amount of the beverage based on the calculated amount of the discharged beverage. The controller 280 may determine whether all of the beverage in the fermentation container 12 is discharged based on information on the calculated residual amount of the beverage. In addition, the controller 280 may control an overall operation of the beverage maker.

Figure 6:
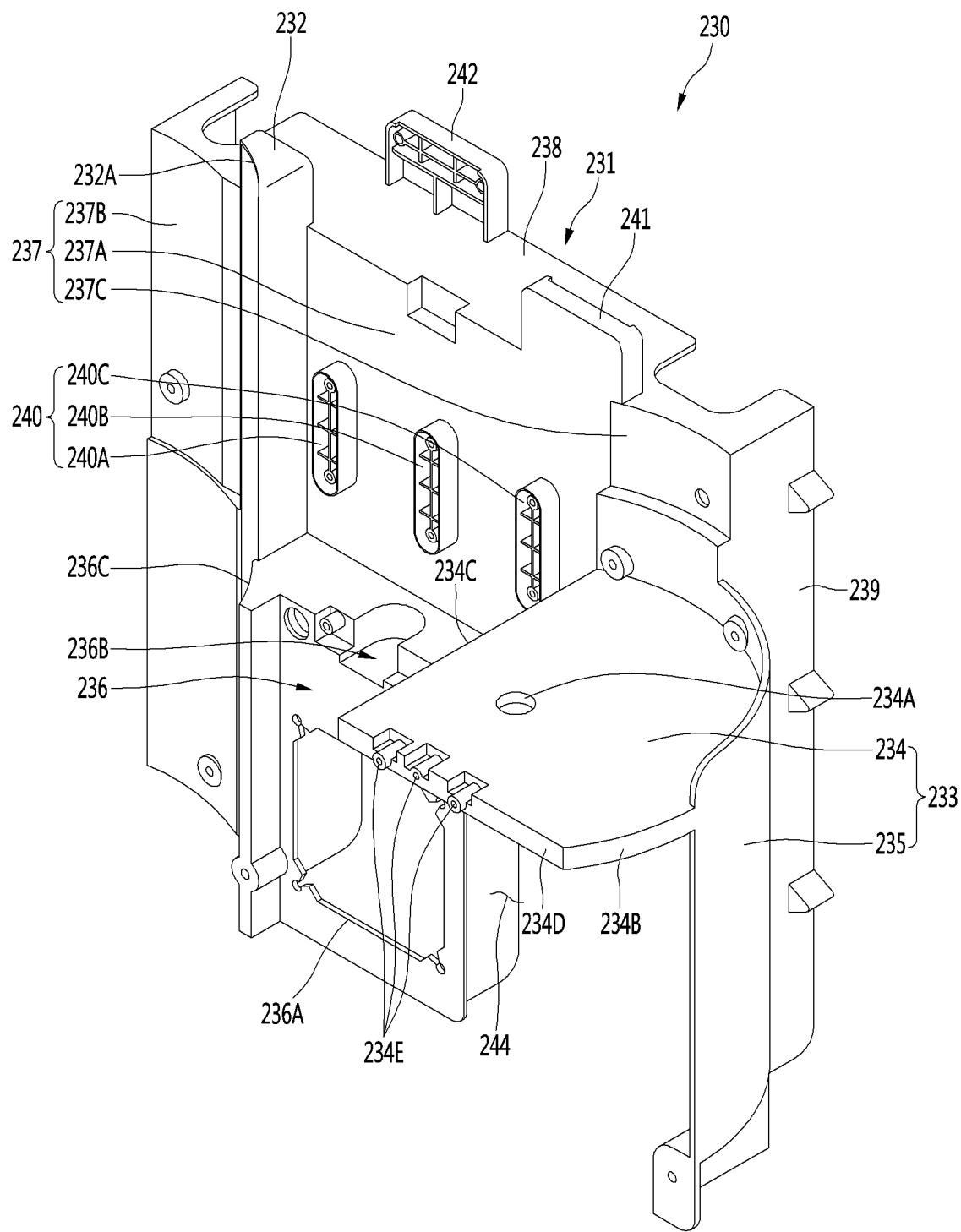
FIG. 6 is a perspective view illustrating a main frame according to an embodiment.
Figure 7:
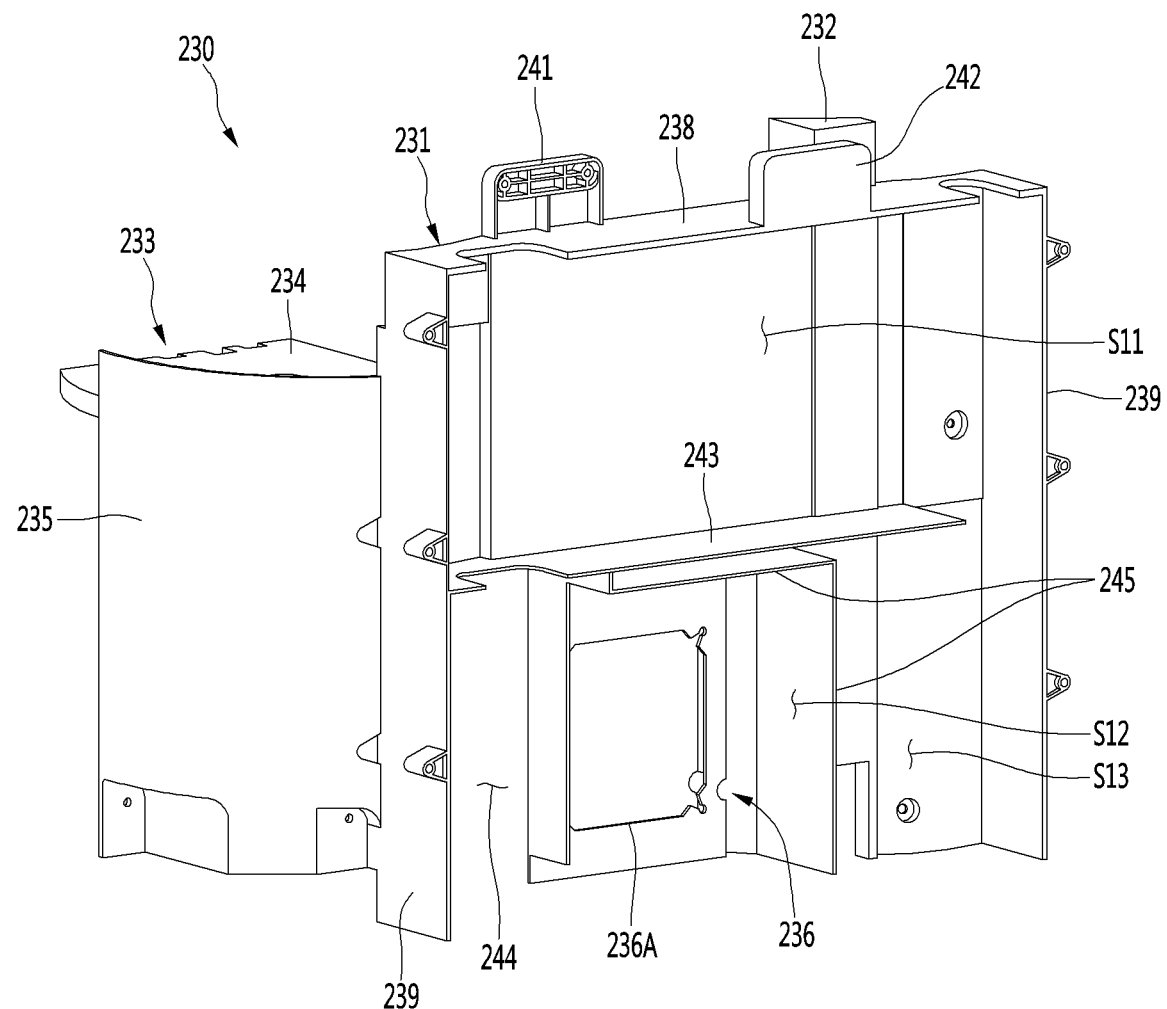
FIG. 7 is a perspective view illustrating the main frame of FIG. 6 when viewed in a different direction.
Figure 8:
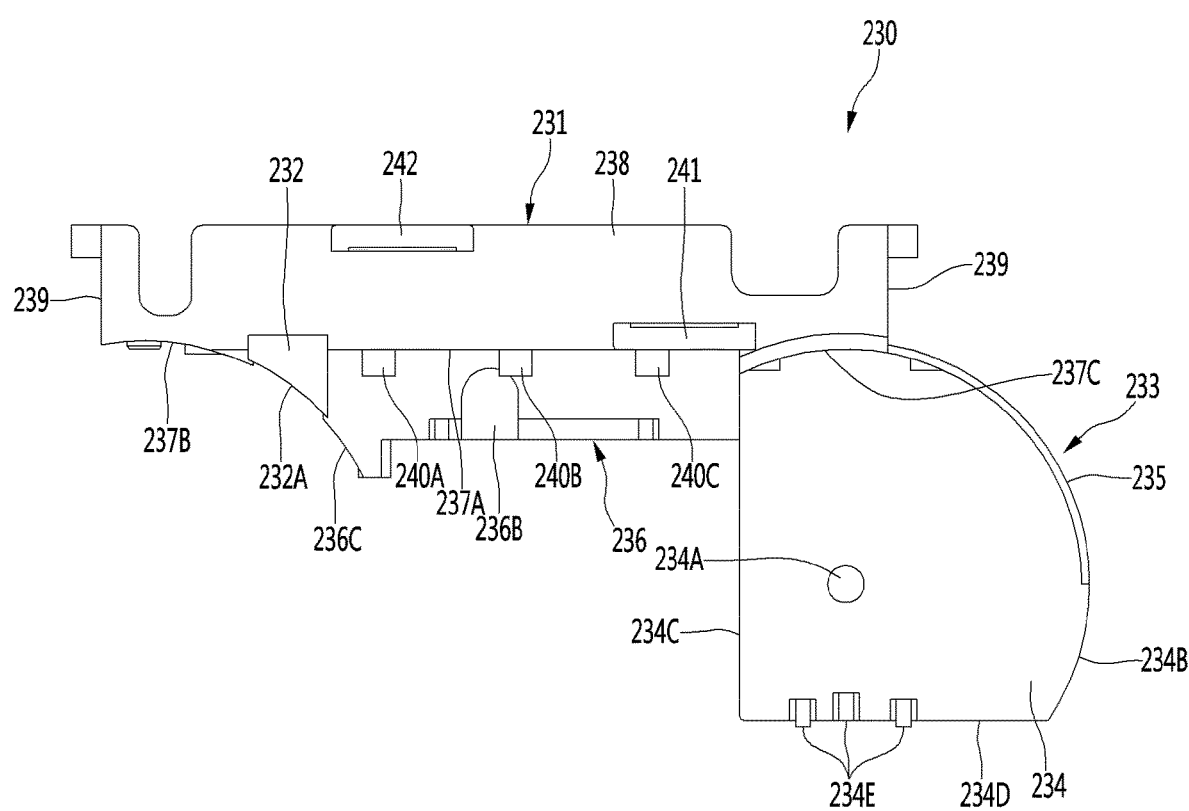
FIG. 8 is a plan view illustrating the main frame of FIG. 6.
Figure 9:
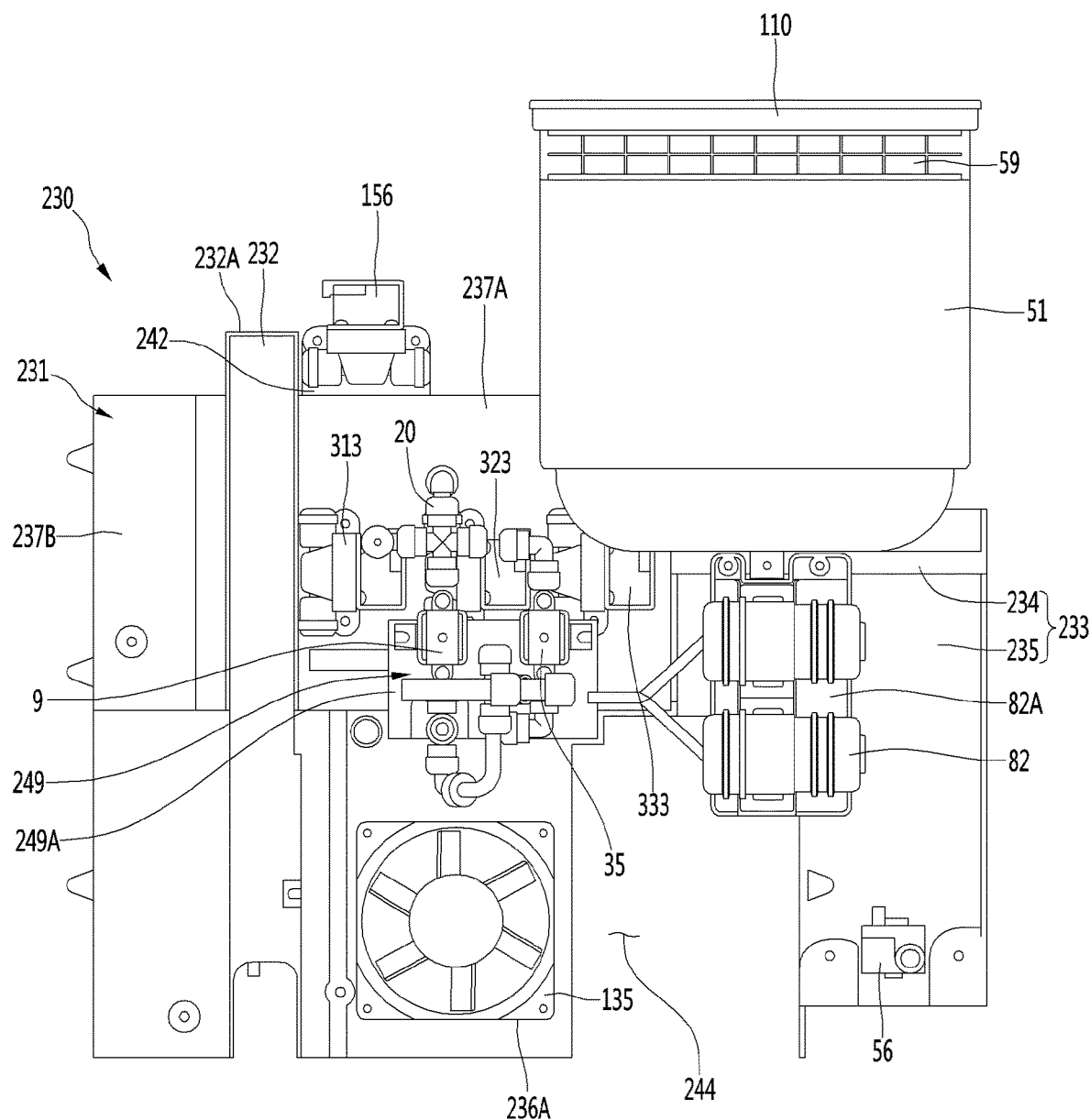
FIG. 9 is a front view illustrating a case where a plurality of components are arranged in the main frame of FIG. 6.
Figure 10:
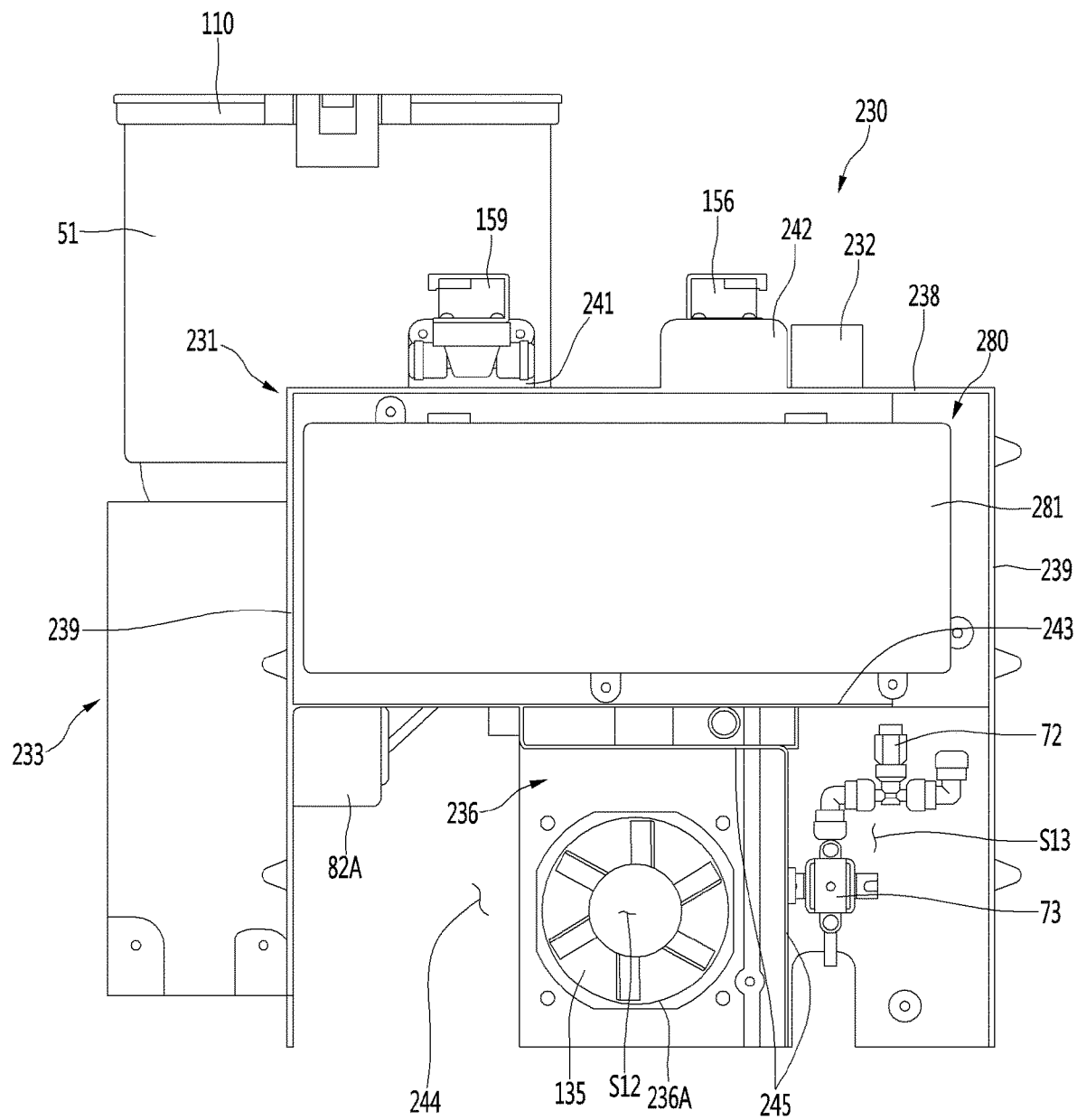
FIG. 10 is a rear view illustrating a case where the plurality of components are arranged in the main frame of FIG. 6.

FIG. 6 is a perspective view illustrating a main frame according to an embodiment, FIG. 7 is a perspective view illustrating the main frame of FIG. 6 when viewed in a different direction, FIG. 8 is a plan view illustrating the main frame of FIG. 6, FIG. 9 is a front view illustrating a case where a plurality of components are arranged in the main frame of FIG. 6, and FIG. 10 is a rear view illustrating a case where the plurality of components are arranged in the main frame of FIG. 6.

At least a part of the channel assembly 2 may be mounted on the main frame 230. The main frame 230 may be a channel assembly mounter. Also, at least one of the air injection pump 82, the blower 135, the water pump 52, and the water heater 53 may be mounted on the main frame 230. A holder mount on which a channel holder configured to fix a channel or a line included in the channel assembly 2 is mounted may be formed in the main frame 230. The controller 280 may be mounted on the main frame 230, which may include a frame body 231. A bottom surface and a rear surface of the frame body 231 may have an open box shape. The frame body 231 may be arranged vertically. An open portion 244 opened in the frontward-rearward direction may be formed in the frame body 231. The open portion 244 may be formed at a lower portion of the frame body 231. The open portion 244 may be provided beside a blower mount 236. The open portion 244 may be formed between the blower mount 236 and the water tank supporter 233.

A beverage maker having the open portion 244 may be more compact than a beverage maker where the open portion 244 is not formed, since the open portion 244 provides an enlarged space inside the outer case 200 where various components may be arranged. Also, the refrigerant channel connecting the compressor 131 and the condenser 132 may be positioned to pass through the open portion 244.

The main frame 230 may include a flat surface 237A on which the channel assembly 2 is mounted, and may further include curved surfaces 237B and 237C facing the fermentation device 1 and/or the water tank 51. A front surface 237 of the frame body 231 may include the flat surface 237A and the curved surfaces 237B and 237C. The curved surfaces 237B and 237C may face the fermentation device 1 and the water tank 51, respectively. The flat surface 237A of the front surface 237 may be provided between the pair of curved surfaces 237B and 237C. Valve mounts 240A, 240B, and 240C on which valves 313, 323, and 333 are mounted may be formed on the flat surface 237A.

The first curved surface 237B located on one side of the flat surface 237A may cover the fermentation device 1 in the frontward-rearward direction, and may be formed to have the same curvature as the outer circumference of the fermentation device 1; more particularly, an outer circumference of the fermentation case 160. The second curved surface 237C located on the other side of the flat surface 237A may cover the water tank 51 in a front-rear direction, and may be formed to have the same curvature as the rear surface of the water tank 51. The beverage maker may become more compact in a front-rear direction due to the curved surfaces 237B and 237C. The open portion 244 may be formed below the flat surface 237A and/or the second curved surface 237C of the front surface 237 of the frame body 231.

The controller 280 may be provided in the frame body 231. A controller space S11 in which the controller 280 is provided may be formed inside the frame body 231. A rear surface of the controller space S11 may be open, and the controller 280 may be arranged in the controller space S11 from the rear side of the frame body 231. The controller space S11 may face the cover through-hole 264 formed in the first rear cover 260. The PCB case 281 of the controller 280 may be fastened to the frame body 231. The PCB case 281 may protect the main PCB therein.

A partition plate 243 may be provided in the frame body 231. The partition plate 243 may protrude rearward from an inside of the frame body 231 and may be arranged transversely. The partition plate 243 may partition an interior of the frame body 231 into an upper space and a lower space positioned below the upper space. The upper space may include the controller space S11 in which the controller 280 is provided. The lower space may include a condenser space S12 and a gas discharge space S13, which will be described hereinafter.

At least one valve mount 240, 241, and 242 may be formed in the frame body 231. The valve mounts 240, 241, and 242 may be formed on the front surface 237 or an upper surface 238 of the frame body 231. At least a part of the inlet module 3A may be mounted on the main frame 230. The valves 313, 323, and 333 may be mounted on the main frame 230. At least one valve mount 240 may be provided on the flat surface 237A of the front surface 237 of the frame body 231, and the valves 313, 323, and 333 may be mounted on the valve mounts 240.

The number of the valve mounts 240 may be the same as the number of the valves 313, 323, and 333. The first valve 313 may be mounted on a first valve mount 240A, the second valve 323 may be mounted on a second valve mount 240B, and the third valve 333 may be mounted on a third valve mount 240C. The valve mounts 240 may be transversely located between a contact body 232 and the water tank supporter 233. Also, the valve mounts 240 may be located above the blower mount 236.

Also, at least a part of the air controlling channel assembly 15 may be mounted on the main frame 230. At least one of the air supply valve 159 and the air discharge valve 156 may be mounted on the main frame 230. At least one air controlling valve mount 241 and 242 may be formed on the upper surface 238 of the frame body 231, and the air supply valve 159 and/or the air discharge valve 156 may be mounted on the air controlling valve mounts 241 and 242. The air supply valve 159 may be mounted on the first air controlling valve mount 241, and the air discharge valve 156 may be mounted on the second air controlling valve mount 242.

The first air controlling valve mount 241 may be positioned closer to the water tank support 233 among the contact body 232 and the water tank supporter 233, and the second air controlling valve mount 242 may be positioned closer to the contact body 232 among the contact body 232 and the water tank supporter 233. That is, the air supply valve 159 and the first air controlling valve mount 241 may be arranged to be closer to the water tank 51 among the fermentation device 1 and the water tank 51, and the air discharge valve 156 and the second air controlling valve mount 242 may be arranged to be closer to the fermentation device 1 among the fermentation device 1 and the water tank 51. Accordingly, when the air discharge valve 156 is switched on and opened, the air may be promptly discharged from the fermentation tank assembly 111 of the fermentation device 1.

The main frame 230 may further include the contact body 232 in contact with the fermentation device 1. The contact body 232 may be provided on the front surface of the frame body 231. The contact body 232 may be provided between the flat surface 237A and the first curved surface 237B of the front surface 237 of the frame body 231. The contact body 232 may extend vertically, and a part of an upper portion of the contact body 232 may protrude above the upper surface 238 of the frame body 231. The contact body 232 may be located between the inner end of the lower front cover 216 (see FIG. 3) of the front fermentation device cover 211, and the inner end 267B of the lower rear cover 267 (see FIG. 3) of the rear fermentation device 262 along an outer circumferential direction of the fermentation device 1.

The contact body 232 may include a contact portion 232A. The contact portion 232A may contact an outer circumference of the fermentation device 1. The contact portion 232A may be rounded in a transverse direction, and the curvature of the contact portion 232A may be the same as the curvature of the outer circumference of the fermentation device 1. Also, the curvature of the contact portion 232A may be the same as the curvature of the first curved surface 237B. When the fermentation device 1 is mounted, a mounting position of the fermentation device 1 may be determined based on the fermentation device cover 201 (see FIG. 2), the first curved surface 237A of the frame body 231, and the contact portion 232A of the contact body 232.

The main frame 230 may further include the water tank support 233 supporting the water tank 51. The water tank supporter 233 may be provided on the front surface 237 of the frame body 231. The water tank support 233 may be provided on the second curved surface 237C of the front surface 237 of the frame body 231. The water tank support 233 may not overlap with the flat surface 237A of the front surface 237 of the frame body 231 in a front-rear direction. The water tank support 233 may be transversely spaced apart from the contact body 232. The contact body 232 may be positioned closer to one or a first surface among opposite surfaces 239 of the frame body 231, and the water tank support 233 may be arranged to be closer to the other or a second surface among the opposite surfaces 239 of the frame body 231.

The water tank support 233 may include a support plate 234 and a reinforcement wall 235. The support plate 234 may be upwardly spaced apart from the base 100. The water tank 51 may be provided on the support plate 234, and the support plate 234 may support the water tank 51 on a lower side thereof. A water supply hole 234A may be formed in the support plate 234. The water supply hole 234A may be penetrated vertically, and a water tank outlet channel 54 (see FIG. 1) connected to the water tank 51 may pass through the water supply hole 234.

At least a part of a circumferential surface of the support plate 234 may be rounded. The circumferential surface of the support plate 234 may include a rounded outer surface 234B, a flat inner surface 234C, and a flat front surface 234D. The outer surface 234B of the support plate 234 may be rounded, and may have the same curvature as the second curved surface 237C of the frame body 231. As the inner surface 234C of the support plate 234 is formed in a flat surface, a space between the water tank support 233 and the fermentation device 1 may be widened.

An air injection pump mount 234E on which the air injection pump 82 is mounted may be formed in the main frame 230. The air injection pump mount 234E may be provided on the front surface 234C of the support plate 234. The air injection pump 82 may be directly mounted on the air injection pump mount 234E, or a bracket 82A to which the air injection pump 82 is coupled may be mounted on the air injection pump mount 234E.

The compressor 131 may be arranged between the base 100 and the water tank 51. The compressor 131 may be vertically arranged between the support plate 234 and the base 100. That is, the support plate 234 may be upwardly spaced apart from the base 100 such that a separation space in which the compressor 131 is arranged may be formed. Accordingly, the beverage maker may be more compact. The reinforcement wall 235 may extend downward from the support plate 234. The reinforcement wall 235 may be formed as a portion of a circumferential surface of the support plate 234 that protrudes downward. The reinforcement wall 235 may be formed as a portion of the outer surface 234B of the circumferential surface of the support plate 234 that protrudes downward. The compressor 131 may be transversely arranged between the reinforcement wall 235 and the fermentation device 1.

The reinforcement wall 235 may be in contact with the support plate 234 and the base 100. A lower end of the reinforcement wall 235 may be supported while contacting the base 100. The reinforcement wall 235 may prevent the support plate 234 from being damaged or from being separated from the frame body 231 due to a load of the water tank 51. In addition, the reinforcement wall 235 may surround the separation space between the base 100 and the support plate 234 to protect the compressor 131 and anything else arranged in the separation space. The reinforcement wall 235 may not overlap with the frame body 231 in a front-rear direction. The reinforcement wall 235 may not cover the open portion 244 of the frame body 231. The outer surface of the reinforcement wall 235 may be surrounded by the water tank cover 202.

The main frame 230 may further include the blower mount 236 on which the blower 135 is mounted. The blower mount 236 may be provided in the frame body 231. The blower mount 236 may be positioned beside the open portion 244 formed in the frame body 231. The blower mount 236 may be transversely located between the open portion 244 and the contact body 232. The blower mount 236 may protrude forward from the frame body 231. The blower mount 236 may be transversely located between the water tank support 233 and the contact body 232. The blower mount 236 may be positioned closer to the contact body 232 than the water tank support 233. One or a first side of the blower mount 236 may be in contact with the contact body 232.

A mounting hole 236A opened in a front-rear direction may be formed in the blower mount 236. The blower 135 may be fastened to a front surface of the blower mount 236, and may be mounted on the mounting hole 236A. The blower 135 may face the condenser 132 from the front side of the condenser 132. The blower 135 and the blower mount 236 may be transversely located between the fermentation device 1 and the compressor 131. The blower 135 and the blower mount 236 may further be transversely located between the fermentation device 1 and the water tank supporter 233. The blower mount 236 may be located in front of the condenser space S12 in which at least a portion of the condenser 132 is provided. The condenser space S12 may be formed in the main frame 230 and may be located behind the blower mount 236.

The condenser space S12 may be located below the controller space S11. The partition plate 243 may be positioned between the condenser space S12 and the controller space S11. The partition plate 243 and a barrier 245 may maintain a temperature of the controller 280 by protecting the controller 280 from heat emitted by the condenser 132. The rear surface of the condenser space S12 may be open. Accordingly, the air heat-exchanged by the condenser 132 may pass through the cover through-hole 264 of the first rear cover 260 and may be discharged to the through-hole 271 of the second rear cover 270.

The barrier 245 may be provided in the main frame 230. The barrier 245 may be provided in the blower mount 236, and the barrier 245 may surround at least a part of the condenser space S12. The barrier 245 may be an insulation barrier configured to prevent the heat emitted by the condenser 132 from being diffused. The barrier 245 may protrude rearward from the blower mount 236. The barrier 245 may be located below the partition plate 243. The barrier 245 may be an air guide configured to guide the air blown by the blower 135 such that the air may pass through the condenser 132 without spreading to the surroundings.

An auxiliary contact portion or auxiliary contact 236C in contact with the fermentation device 1 may be formed in the blower mount 236. The auxiliary contact 236C may protrude forward from the blower mount 236. The auxiliary contact 236C may be in contact with the contact body 232. The auxiliary contact 236C may be transversely rounded, and may have the same curvature as the contact portion 232A of the contact body 232.

The gas discharge space S13 in which at least a part of the gas discharger 7 is provided may be formed in the main frame 230. The gas discharge space S13 may be provided in the frame body 231. The gas discharge space S13 may be located below the partition wall 243, and may be partitioned from the condenser space S12 by the barrier 245. At least a part of the gas discharger 7 may be arranged in the gas discharge space S13; for example, the pressure sensor 72 and the gas discharge valve 73 may be provided in the gas discharge space S13. A rear surface of the gas discharge space S13 may be open. Accordingly, the gas discharged from the gas discharger 7 may pass through the cover through-hole 264 of the first rear cover 260 and may be discharged to the through-hole 271 of the second rear cover 270.

At least one valve installed in the main channel 4 may be fixed to the main frame 230. At least one of the main valve 9, the bypass valve 35, and the switch valve 20 may be fixed to the main frame 230. A valve mount 249 on which at least one of the main valve 9, the bypass valve 35, and the switch valve 20 is mounted may be provided in the main frame 230. The valve mount 249 may include a valve bracket 249A. In the main frame 230, at least one of the main valve 9, the bypass valve 35, and the switch valve 20 may be fastened to the valve bracket 249A. The valve bracket 249A may be mounted on a bracket groove 236B formed in the blower mount 236. The bracket groove 236B may be formed as a part of an upper portion of a front surface of the blower mount 236 that is recessed rearward.

Figure 11:
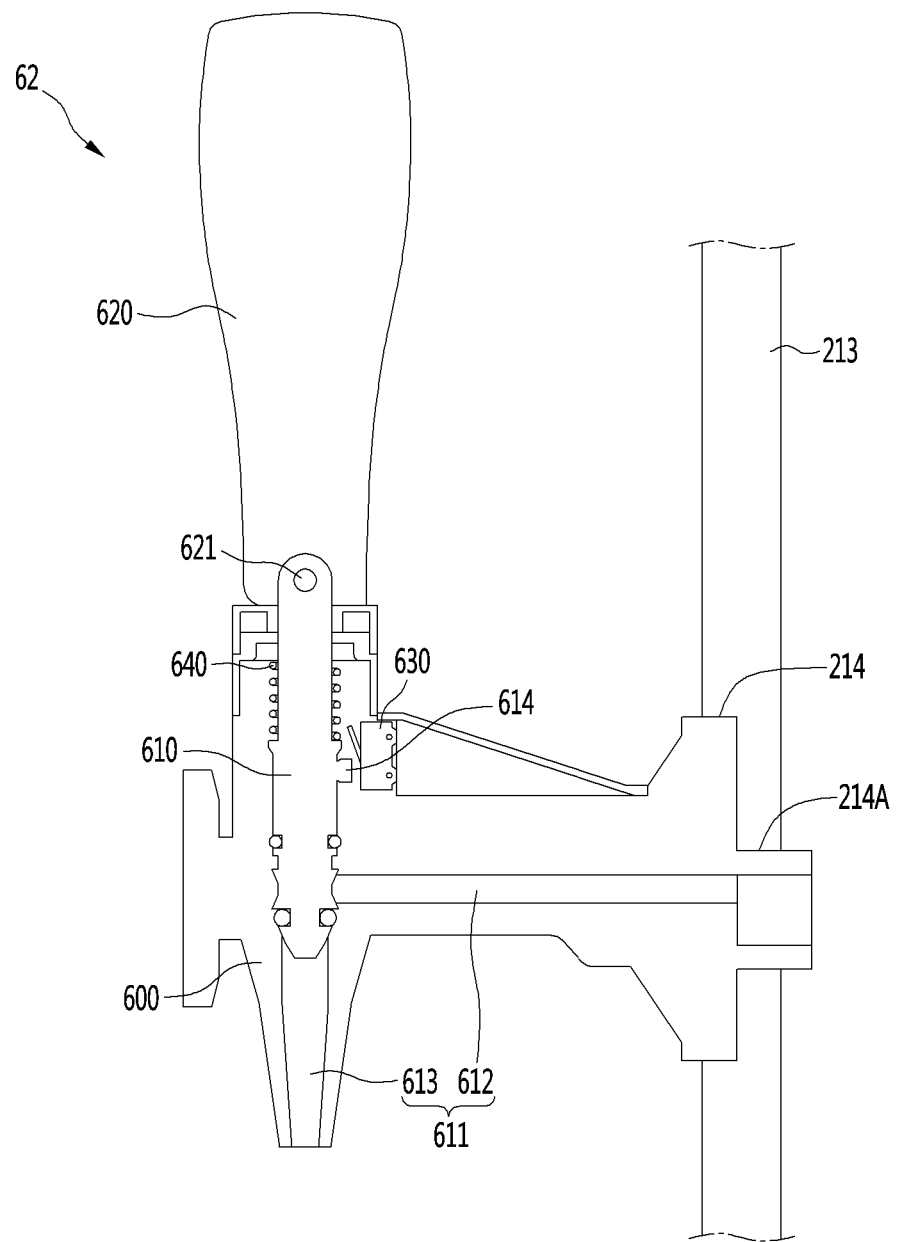
FIG. 11 is a sectional view illustrating a dispenser of the beverage maker according to an embodiment.

FIG. 11 is a sectional view illustrating a dispenser in the beverage maker according to an embodiment. The dispenser 62 may include a valve body 600, an elevation valve body 610, a lever or rotation lever 620, and a limit switch 630. A valve channel 611 connected to the beverage discharge channel 61 (see FIG. 1) may be formed in the valve body 600. The elevation valve body 610 may be provided above the valve body 600, and may open and/or close the valve channel 611. The rotation lever 620 may be rotatably connected to an upper portion of the elevation valve body 610, and may elevate the elevation valve body 610 when being rotated. The elevation valve body 610 may be elevated up from the valve body 600. The limit switch 630 may be switched on and/or off by the elevation valve body 610. The dispenser 62 may further include a valve spring 640 embedded in the valve body 600 and may elastically press the elevation valve body 610 downward.

The valve body 600 may be mounted on a discharge valve mount or valve mount 214 formed in the center cover 213. The valve channel 611 may include a transverse channel 612 extending along the valve body 600 in the frontward-rearward direction, and a vertical channel 613 bent downward from a tip end of the transverse channel 612. When the transverse channel 612 is opened, the beverage guided to the beverage discharge channel 61 may be dropped to a lower side of the vertical channel 613 after sequentially passing through the transverse channel 612 and the vertical channel 613. The valve body 600 may include a transverse portion in which the transverse channel 612 may be formed and a vertical portion perpendicular to the transverse portion in which the vertical channel 613 may be formed.

The elevation valve body 610 may be provided in the valve channel 611; particularly, in the vertical channel 613. The elevation valve body 610 may be lowered to a height at which the elevation valve body 610 blocks the transverse channel 612, and may be lifted up to a height at which the elevation valve body 610 opens the transverse channel 612. An upper portion of the elevation valve body 610 may protrude upward of or above the valve body 600. When the elevation valve body 610 is lifted up, a manipulation protrusion 614 that contacts the limit switch 630 may protrude from the elevation valve body 610.

The rotation lever 620 may be hinged to an upper portion of the elevation valve body 610, and may be provided in a vertical or transverse direction while being connected to the elevation valve body 610. When the rotation lever 620 is placed into a transverse direction, the elevation valve body 610 is lifted up to open the transverse channel 612, and when the rotation lever 620 is placed in a vertical direction, the elevation valve body 610 is lowered to close the transverse channel 612.

The limit switch 630 may be electrically connected to the controller 280, and the controller 280 may control the beverage maker according to an ON/OFF state of the limit switch 630. The valve spring 640 may be arranged at an upper portion of the vertical portion of the valve body 600 and may elastically press the elevation valve body 610 downward.

Figure 12:
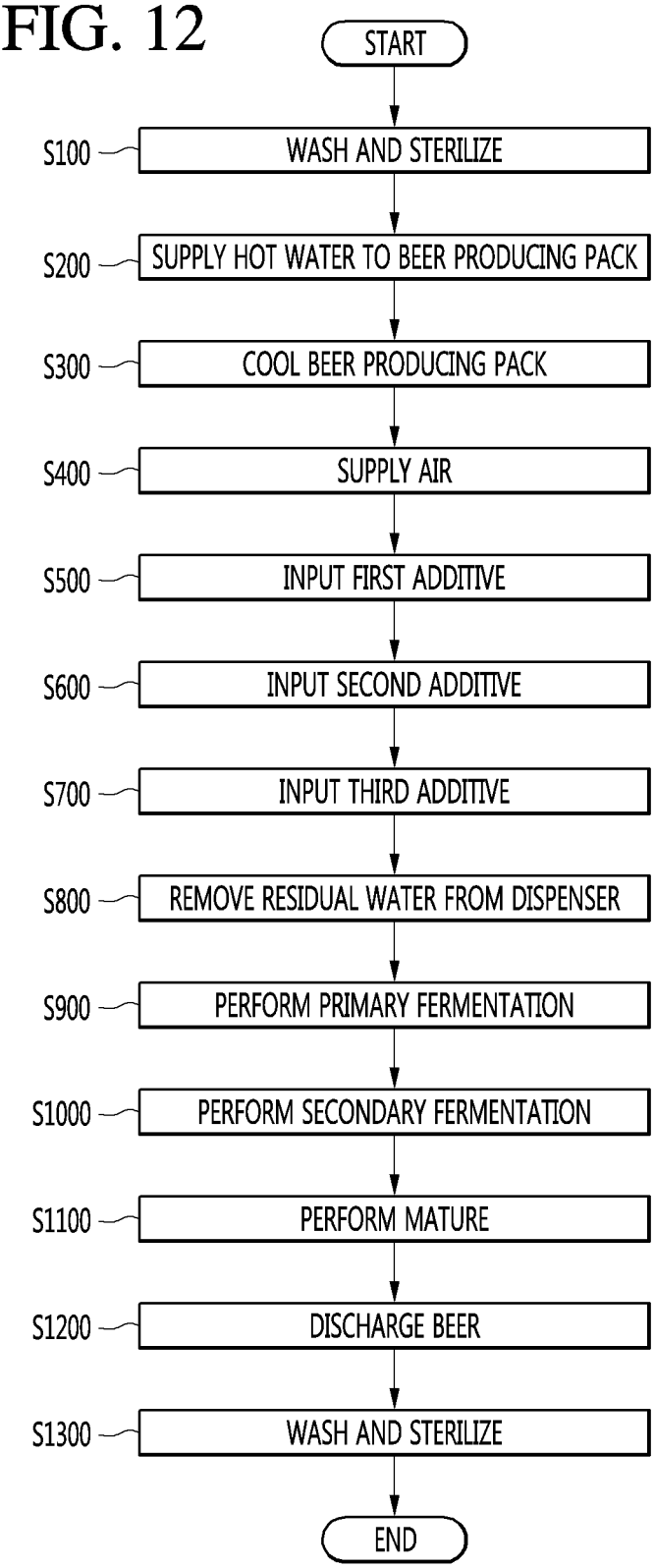
FIG. 12 is a flowchart illustrating a control sequence for the beverage maker according to an embodiment.

FIG. 12 is a flowchart illustrating a control sequence of the beverage maker according to an embodiment. Hereinafter, an operation of the beverage maker according to an embodiment will be described with reference to FIG. 12 together with FIG. 1.

A method of producing a beverage by the beverage maker according to an embodiment may include washing and sterilizing steps S100 and S1300, wherein the channels in the beverage maker are washed and sterilized. The washing and sterilizing steps S100 and S1300 may be performed separately from a beverage production. The washing and sterilizing steps S100 and S1300 may be performed before the beverage production is performed and after the beverage production is performed. The washing and sterilizing steps S100 and S1300 may be performed by a user's input during the beverage production. In this case, like a primary fermenting step or a secondary fermenting step, the washing and sterilizing steps S100 and S1300 may be performed while the main valve 9 is closed and additives are not contained in the material supplier 3. The washing and sterilizing steps S100 and S1300 may be performed in a state in which the capsules C1, C2, and C3 are not accommodated in the material supplier 3. On the other hand, the beverage production may be performed in a state in which the capsules C1, C2, and C3 are accommodated in the material supplier 3 and the fermentation container 12 is in the fermentation tank 112.

The user may input a washing and sterilizing command through the input provided in the controller 280, a remote controller, or a portable terminal, for example. The controller 280 may control the beverage maker to perform the washing and sterilizing steps S100 and S1300 according to input of the washing and sterilizing command. The user may input a beverage producing command through the input provided in the controller 280, a remote controller, or a portable terminal, for example (hereinafter, "input"). Before and after the beverage production is performed according to the input of the beverage producing command, the controller 280 may automatically control the beverage maker to perform the washing and sterilizing steps S100 and S1300.

Hereinafter, the washing and sterilizing step S100 performed before the beverage production will be described. When the dispenser 62 is closed, the controller 280 may display a message to open the dispenser 62 on the display 282, and the user may open the dispenser 62 to switch on the limit switch 630. When the limit switch 630 of the dispenser 62 is switched on and the washing and sterilizing command is given through the input, the controller 280 may switch on the water pump 52 and the water heater 53. The controller 280 may keep the main valve 9 closed.

The controller 280 may control the switch valve 20 to separately or simultaneously wash and sterilize the material supplier 3 and the bypass channel 4C. For example, the controller 280 may wash and sterilize the bypass channel 4C after washing and sterilizing the material suppler 3. When the material supplier 3 is washed and sterilized, the controller 280 may control the switch valve 20 such that the first main channel 4A and the common inlet channel 301 communicate with each other, and may switch on the valves 313, 323, and 333. When the valves 313, 323, and 333 are switched on, the valves 313, 323, and 333 may be opened.

When the bypass channel 4C is washed and sterilized, the controller 280 may control the switch valve 20 such that the first main channel 4A and the bypass channel 4C communicate with each other, and may switch on the bypass valve 35. When the bypass valve 35 is switched on, the bypass valve 35 may be opened. When the water pump 52 is switched on, water in the water tank 51 may flow to the water heater 52 and may be heated by the water heater 52.

When the controller 280 controls the switch valve 20 such that the first main channel 4A and the common inlet channel 301 communicate with each other, the water (that is, hot water) heated by the water heater 53 may flow to the first capsule holder 31, the second capsule holder 32, and the third capsule holder 33 through the inlet channels 311, 321, and 331. The water heated by the water heater 53 may flow to the second main channel 4B after passing through the first capsule holder 31, the second capsule holder 32, and the third capsule holder 33, and may be discharged to the dispenser 62 through the beverage discharge channel 61.

When the controller 280 controls the switch valve 20 such that the first main channel 4A and the bypass channel 4C communicate with each other, the water (that is, the hot water) heated by the water heater 53 may flow to the bypass valve 35 through the bypass channel 4C. The water heated by the water heater 53 may flow to the second main channel 4B after passing through the bypass valve 35, and may be discharged to the dispenser 62 through the beverage discharge channel 61.

When the control is performed as described above, the first main channel 4A, the bypass channel 4C, the bypass valve 35, the capsule holders 31, 32, and 33, the beverage discharge channel 61, and the dispenser 62 may be washed and sterilized by the water heated by the water heater 53. The beverage maker may perform the above-described washing and sterilizing during a washing set time, and may complete the washing and sterilizing process after the washing set time. After the washing set time elapses, the controller 280 may switch off the water pump 52 and the water heater 53, and may switch off all the bypass valve 35 and the valves 313, 323, and 333. When the bypass valve 35 and the valves 313, 323, and 333 are switched off, all the bypass valve 35 and the valves 313, 323, and 333 may be closed.

The method of producing a beverage using the beverage maker according to an embodiment may include a beverage producing course or beverage production of producing a beverage. Hereinafter, the beverage production will be described. In the beverage production, the user may open the fermentation lid 107, insert the fermentation container 12 into the opening 170, and place the fermentation container 12 on the fermentation tank assembly 111. Thereafter, the user may close the fermentation lid 107, and the fermentation container 12 may be provided and stored in the fermentation tank assembly 111. An inside of the fermentation tank 112 may be closed by the fermentation lid 107.

Before and after the fermentation container 12 is placed in the fermentation tank assembly 111, the user may cover the plurality of capsule holders 31, 32, and 33 using the lid 37 after inserting the plurality of capsules C1, C2, and C3 into the material supplier 3. The user may input a beverage producing command through the input connected to the controller 280, the remote controller, or the portable terminal, for example. The controller 280 may control the beverage maker to perform the beverage production according to the input of the beverage producing command. In the beverage production, the controller 280 may initiate a water supplying step S200 of supplying water to the fermentation container 12. The water supplying step S200 may be a liquid malt forming step of forming liquid malt by evenly mixing malt in the fermentation container 12 with the hot water.

In the water supplying step S200, the controller 280 may switch on the water pump 52 and the water heater 53, and may control the switch valve 20 such that the first main channel 4A and the bypass channel 4C communicate with each other. In the water supply step S200, the controller 280 may switch on the bypass valve 35, and may switch on the main valve 9. The controller 280 may switch on the main valve 9, which is switched off, to open the main valve 9. In the water supply step S200, the controller 280 may maintain the first valve 313, the second valve 323, and the third valve 333 in an OFF state. The controller 280 may switch on the gas discharge valve 73 when the water is supplied to the fermentation container 12. Further, the controller 280 may switch on the air discharge valve 156 to open the air discharge valve 156.

The water in the water tank 51 may be discharged from the water tank 51 to pass through the water pump 52, may flow to the water heater 53, and may be heated by the water heater 53. The water heated by the water heater 53 may sequentially pass through the first main channel 4A, the switch valve 20, and the bypass valve 35, and may pass through the main valve 9 to be introduced into the fermentation container 12. The hot water introduced into the fermentation container 12 through the main channel 4 may be mixed with the malt in the fermentation container 12, and the malt in the fermentation container 12 may be mixed with the water and thus gradually diluted. Since the hot water is supplied to the fermentation container 12, the malt in the fermentation container 12 may be quickly and evenly mixed with the hot water.

The fermentation container 12 may gradually expand when the water is introduced as described above, and some of the air between the fermentation container 12 and the fermentation tank 112 may flow to the air supply channel 154 as the fermentation container 12 is expanded. The air flowing to the air supply channel 154 may be discharged to the air discharge valve 156. While the water is introduced into the fermentation container 12, some of the air between the fermentation container 12 and the fermentation tank 112 may be discharged through the air discharge valve 156, and the fermentation container 12 may receive the water without being broken or torn inside the fermentation tank 112.

In the water supply step S200, the water heater 53 may heat the water to 50° C. to 70° C., and the controller 280 may control the water heater 53 depending on the temperature detected by the thermistor 57. The beverage maker may perform the water supplying step S200 until an amount of the water detected by the flow meter 56 arrives at a predetermined amount. When the water supply step S200 is completed, the controller 280 may switch off the water pump 52 and the water heater 53, and may switch off the bypass valve 35. When the water supply step S200 is completed, the controller 280 may switch off the valve 73. When the water supplying step S200 is completed, the controller 280 may close the air discharge valve 156. The beverage maker may perform a control such that the air is introduced into the fermentation container 12 during the water supplying step S200.

The controller 280 may primarily introduce the water into the fermentation container 12, and then terminate the introduction. Thereafter, the controller 280 may inject the air into the fermentation container 12, and then terminate the injection. Finally, the controller 280 may secondarily introduce the hot water into the fermentation container 12, and then terminate the introduction. Further, after all the primary water introduction, the air injection, and the secondary water introduction are completed, the water supplying step S200 may be completed.

As an example of the water supplying step S200, only a hot water supply process of supplying the hot water may be performed. As another example of the water supplying step S200, a primary hot water supplying process of primarily supplying the hot water, an air injecting process of injecting the air, and a secondary hot water supplying process of secondarily supplying the hot water may be sequentially performed.

The first example where only one hot water supplying process is performed will be described below. When the hot water supply process is initiated, the controller 280 may switch on the water pump 52 and the water heater 53, and may control the switch valve 20 such that the first main channel 4A and the bypass channel 4C communicate with each other. Also, when the hot water supply process is initiated, the controller 280 may switch on the bypass valve 35, and may switch on the main valve 9. When the hot water supply process is initiated, the controller 280 may switch on the valve 73. When the hot water supplying process is initiated, the controller 280 may switch on the air discharge valve 156. Further, when the hot water supplying process is completed, the controller 280 may switch off the water pump 52 and the water heater 53, and may switch off the bypass valve 35. When the hot water supply process is completed, the controller 280 may switch off the valve 73. When the hot water supplying process is completed, the controller 280 may switch off the air discharge valve 156.

Hereinafter, another example where the water supply step S200 includes the primary hot water supplying process, the air injecting process, and the secondary hot water supplying process that are sequentially performed will be described. When the primary hot water supply process is initiated, the controller 280 may switch on the water pump 52 and the water heater 53, and may control the switch valve 20 such that the first main channel 4A and the bypass channel 4C communicate with each other. Also, when the primary hot water supplying process is initiated, the controller 280 may switch on the bypass valve 35, and may switch on the main valve 9. When the primary hot water supplying process is initiated, the controller 280 may switch on the valve 73. When the primary hot water supplying process is initiated, the controller 280 may switch on the air discharge valve 156. Further, when the primary hot water supplying process is completed, the controller 280 may switch off the water pump 52 and the water heater 53. When the primary hot water supplying process is completed, the controller 280 may maintain the bypass valve 35 and the main valve 9, the valve 73, and the air discharge valve 156 in an ON state. In the primary hot water supplying process, the water may be introduced into the fermentation container 12, the fermentation container 12 may be expanded by the introduced water, and some of the air between the fermentation container 12 and the fermentation tank 112 may be pushed by the expanded fermentation container 12 to flow to the air supply channel 154, and may be discharged to the outside through the air discharge valve 156.

When the air injecting process is initiated, the controller 280 may switch on the air injection pump 82. The controller 280 may control the switch valve 20 such that the air injection channel 81 and the bypass channel 4C communicate with each other, and may lose the air supply valve 159.

While the air injection pump 82 is switched on, the air pumped by the air injection pump 82 may be introduced into the bypass channel 4C through the air injection channel 81, and may be introduced into the fermentation container 12 through the main valve 9. In this way, the air introduced into the fermentation container 12 may evenly mix with the liquid malt and the hot water. As the air is introduced into the fermentation container 12, the fermentation container 12 may expand, and some of the air between the fermentation container 12 and the fermentation tank 112 may be pushed by the expanding fermentation container 12 to flow to the air supply channel 154, and may be discharged to the outside through the air discharge valve 156.

When a pressure detected by the pressure sensor 72 is not less than a predetermined pressure, the controller 280 may complete the air injection process, and may switch off the air injection pump 82 to complete the air injection process. When the air injection process is completed, the controller 280 may maintain the main valve 9, the bypass valve 35, the valve 73, and the air discharge valve 156 in an ON state.

When the secondary hot water supplying process is initiated, the controller 280 may switch on the water pump 52 and the water heater 53. The controller 280 may control the switch valve 20 such that the first main channel 4A and the bypass channel 4C communicate with each other. Similar to the primary hot water supplying process, the water in the water tank 51 may be supplied to the fermentation container 12, and new hot water may be additionally supplied to the fermentation container 12. In the secondary hot water supplying process, the fermentation container 12 may further expand due to the additionally introduced water, and some of the air remaining between the fermentation container 12 and the fermentation tank 112 may be pushed by the expanded fermentation container 12 to flow to the air supply channel 154, and may be discharged to the outside through the air discharge valve 156.

The controller 280 may determine whether the secondary hot water supplying process is completed, depending on a flow rate detected by the flow meter 56. When the flow rate detected by the flow meter 56 arrives at a predetermined flow rate during the secondary hot water supplying process, the controller 280 may determine that the secondary hot water supplying process is completed, may switch off the water pump 52 and the water heater 53, and may switch off the main valve 9, the bypass valve 35, and the valve 73. Further, the controller 280 may switch off and close the air discharge valve 156 such that the air in the fermentation tank 112 is not discharged through the air discharge valve 156.

When the water supplying step S200 is completed, the beverage maker may perform a fermentation tank cooling step S300 of cooling the fermentation tank 112. The controller 280 may control the temperature controller 11 to cool the fermentation tank 112. The controller 280 may further control the compressor 131 and the expansion mechanism 133 of the refrigeration cycle 13 to cool the fermentation tank 112. The refrigerant compressed by the compressor 131 may be condensed by the condenser 132 and then may be expanded by the expansion mechanism 133. The refrigerant expanded by the expansion mechanism 133 may absorb heat from the fermentation tank 112 while passing through the evaporator 134, and may be evaporated. The refrigerant passing through the evaporator 134 may be suctioned into the compressor 131. When the compressor 131 is driven, the fermentation tank 112 may be gradually cooled, and so the fermentation container 12 and the liquid malt therein 12 may also be cooled.

When the fermentation tank 112 is cooled as described above, the beverage maker may cool the fermentation container 12 to a middle temperature or a middle temperature range, for example, 23° C. to 27° C., and the controller 280 may control the compressor 131 depending on the temperature detected by the temperature sensor 16 installed in the fermentation tank 112. The controller 280 may switch on the compressor 131 when the temperature detected by the temperature sensor 16 exceeds a predetermined or "compressor-on" temperature, which may be an upper limit of the middle temperature range. The controller 280 may switch off the compressor 131 when the temperature detected by the temperature sensor 16 is less than or equal to another predetermined or "compressor-off" temperature, which may be a lower limit of the middle temperature range.

During the fermentation tank cooling step S300, the controller 280 may maintain the air discharge valve 156 closed such that the air between the fermentation container 12 and the fermentation tank 112 is not discharged to the outside through the air discharge valve 156, and the air in the fermentation tank 112 may be quickly cooled. However, when the temperature of the fermentation container 12 is less than the middle temperature or the middle temperature range due to a very low external temperature, the controller 280 may switch on the heater 14 wound on the fermentation tank 112. The controller 280 may switch on the heater 14 when the temperature detected by the temperature sensor 16 is less than a predetermined or "heater-on" temperature, which may be a lower limit of the middle temperature range. The controller 280 may switch off the heater 14 when the temperature detected by the temperature sensor 16 is greater than or equal to another predetermined or "heater-off" temperature, which may be an upper limit of the middle temperature range.

After the fermentation tank cooling step S300 is initiated and the compressor 131 is switched on as described above, the beverage maker may perform a mixing step S400 of mixing the liquid malt by supplying air into the fermentation container 12 when the temperature detected by the temperature sensor 16 is, at least one time, less than or equal to the "compressor-off" temperature. Alternatively, after the fermentation tank cooling step S300 is initiated and the heater 14 is switched on as described above, the beverage maker may perform the mixing step S400 of mixing the liquid malt by supplying air into the fermentation container 12 when the temperature detected by the temperature sensor 16 is, at least one time, greater than or equal to the "heater-off temperature".

Even during the mixing step S400, the beverage maker may switch on or off the compressor 131 and the heater 14 depending on the temperature detected by the temperature sensor 16, and the ON/OFF control of the compressor 131 and the heater 14 may continue until additive inputting steps S500, S600, and S700 are completed. In the mixing step S400, the controller 280 may switch on the air injection pump 82 and switch off the air supply valve 159, and may control the switch valve 20 such that the air injection channel 81 and the bypass channel 4C communicate with each other. Also, the controller 280 may switch on the bypass valve 35, the main valve 9, and the valve 73. The controller 280 may open the air discharge valve 156.

While the air injection pump 82 is switched on, the air pumped by the air injection pump 82 may be introduced into the bypass channel 4C through the air injection channel 81, and then may be introduced into the fermentation container 12 through the second main channel 4B and the main valve 9. In this way, the air introduced into the fermentation container 12 may help to evenly mix the liquid malt with the water with each other, and may supply oxygen to the liquid malt. While the air is injected into the fermentation container 12, the fermentation container 12 may be expanded by the air injected into the fermentation container 12. The air between the fermentation container 12 and the fermentation tank 112 may be pushed by the expanded fermentation container 12 to flow to the air supply channel 154, and may be discharged to the outside through the air discharge valve 156.

As the air between the fermentation container 12 and the fermentation tank 112 is discharged through the air supply channel 154 and the air discharge valve 156, the fermentation container 12 may easily expand, and the air in the main channel 4 may be promptly introduced into the fermentation container 12 and may be mixed with the liquid malt. The controller 280 may mix the air with the liquid malt during a predetermined mixing time (for example, one hour) after the air injection pump 82 is switched on, may switch off the air injection pump 82 when the air injection pump 82 is switched on and the predetermined mixing time elapses, and may switch off the bypass valve 35 and the valve 73. When the air injection pump 82 is switched off, the controller 280 may close the air discharge valve 156. That is, when the predetermined mixing time elapses, the beverage maker may complete the mixing step S400.

The beverage maker may perform the additive inputting steps S500, S600, and S700 after the mixing step S400. In the additive inputting steps S500, S600, and S700, the beverage maker may simultaneously or sequentially input or add the additive of the first capsule C1, the additive of the second capsule C2, and the additive of the third capsule C3. The controller 280 may sequentially perform an additive inputting process S500 for the first capsule C1, an additive inputting process S600 for a second capsule C2, and an additive inputting process S700 for the third capsule C3.

The additive inputting steps S500, S600, and S700 may be performed via a hydraulic pressure provided by the water supply pump 52 or pneumatic pressure provided by the air injection pump 82. First, a case where the additive inputting steps S500, S600, and S700 are performed by the hydraulic pressure will be described. In the additive inputting steps S500, S600, and S700, the controller 280 may control the switch valve 20 such that the first main channel 4A and the common inlet channel 301 communicate with each other. In the additive inputting process S500 for the first capsule C1, the controller 280 may switch on the water supply pump 52, the main valve 9, the first valve 313, and the gas discharge valve 73 during a first additive setting time. When the water pump 52 is switched on, the water in the water tank 51 may pass through the water pump 52 and the water heater 53, and then may be introduced into the first capsule C1. The water introduced into the first capsule C1 may be mixed with the additive held in the first capsule C1, may flow to the second main channel 4B together with the additive in the first capsule C1, and may be introduced into the fermentation container 12 through the second main channel 4B. When the first additive setting time elapses, the controller 280 may switch off the water pump 52 and the first valve 313, and may complete the additive inputting process S500 for the first capsule C1.

In the additive inputting process S600 for the second capsule C2, the controller 280 may switch on the water pump 52 and the second valve 323 during a second additive setting time. When the water pump 52 is switched on, the water in the water tank 51 may pass through the water pump 52 and the water heater 53, and then may be introduced into the second capsule C2. The water introduced into the second capsule C2 may be mixed with the additive held in the second capsule C2, may flow to the second main channel 4B together with the additive in the second capsule C2, and may be introduced into the fermentation container 12 through the second main channel 4B. When the second additive setting time elapses, the controller 280 may switch off the water pump 52 and the second valve 323, and may complete the additive inputting process S600 for the second capsule C2.

In the additive inputting process S700 for the third capsule C3, the controller 280 may switch on the water pump 52 and the valve 333 during a third additive setting time. When the water ump 52 is switched on, the water in the water tank 51 may pass through the water pump 52, may pass through the water heater 53, and then may be introduced into the third capsule C3. The water introduced into the third capsule C3 may be mixed with the additive held in the third capsule C3, may flow to the second main channel 4B together with the additive in the third capsule C3, and may be introduced into the fermentation container 12 through the second main channel 4B. When the third additive setting time elapses, the controller 280 may switch off the water pump 52 and the third valve 333, and may complete the additive inputting process S700 for the third capsule C3.

The additive inputting steps S500, S600, and S700 may also be performed by the pneumatic pressure. In the additive inputting steps S500, S600, and S700, the controller 280 may control the switch valve 20 such that the air injection channel 81 and the common inlet channel 301 communicate with each other. That is, in the additive inputting steps S500, S600, and S700, the controller 280 may control the switch valve 20 such that the air injection channel 81 and the material accommodating portions communicate with each other. In the additive inputting steps S500, S600, and S700, the controller 280 may close the air supply valve 159, and may open the air discharge valve 156.

In the additive inputting process S500 for the first capsule C1, the controller 280 may switch on the air injection pump 82, the main valve 9, the first valve 313, and the gas discharge valve 73 during the first additive setting time. When the air injection pump 82 is switched on, the pumped air may pass through the first valve 313, and may be then introduced into the first capsule C1. The air introduced into the first capsule C1 may flow to the second main channel 4B together with the additive in the first capsule C1, and may be introduced into the fermentation container 12 through the second main channel 4B. When the first additive setting time elapses, the controller 280 may switch off the air injection pump 82 and the first valve 313, and may complete the additive inputting process S500 for the first capsule C1.

In the additive inputting process S600 for the second capsule C2, the controller 280 may switch on the air injection pump 82 and the second valve 323 during the second additive setting time. When the air injection pump 82 is switched on, the pumped air may pass through the second valve 323, and may be then introduced into the second capsule C2. The air introduced into the second capsule C2 may flow to the second main channel 4B together with the additive in the second capsule C2, and may be introduced into the fermentation container 12 through the second main channel 4B. When the second additive setting time elapses, the controller 280 may switch off the air injection pump 82 and the second valve 323, and may complete the additive inputting process S600 for the second capsule C2.

In the additive inputting process S700 for the third capsule C3, the controller 280 may switch on the air injection pump 82 and the third valve 333 during the third additive setting time. When the air injection pump 82 is switched on, the pumped air may pass through the third valve 333, and may be then introduced into the third capsule C3. The air introduced into the third capsule C3 may flow to the second main channel 4B together with the additive in the third capsule C3, and may be introduced into the fermentation container 12 through the second main channel 4B. When the third additive setting time elapses, the controller 280 may switch off the air injection pump 52 and the third valve 333, and may complete the additive inputting process S700 for the third capsule C3.

As the additives and the air are injected from the main channel 4 into the fermentation container 12, the fermentation container 12 may be further expanded, and the air between the fermentation container 12 and the fermentation tank 112 may be pushed by the expanded fermentation container 12 to flow to the air supply channel 154, and may be discharged to the outside through the air discharge valve 156. As the air between the fermentation container 12 and the fermentation tank 112 is discharged through the air supply channel 154 and the air discharge valve 156, the fermentation container 12 may easily expand, and the additives and the air of the main channel 4 may be promptly introduced into the fermentation container 12.

The method disclosed herein is not limited to only three additive inputting steps. Embodiments may include four or n number of additive inputting steps, wherein the material supplier 3 may include four or n number of additives, capsules Cn, valves $3n3$, inlet channels $3n1$, outlet channels $3n2$, capsule holders $3n$, and an n number of additive setting times. When all of the additive inputting steps S500, S600, and S700 performed by the hydraulic pressure via the water pump 52 are completed, a residual water removing step S800 of removing residual water in the material supplier 3 may be performed. However, when the additive inputting steps S500, S600, and S700 are performed by the hydraulic pressure by the air injection pump 52, the residual water removing step S800 may be omitted In the residual water removing step S800, the controller S800 may switch on the air injection pump 82 and switch off the air supply valve 159, and may control the switch valve 20 such that the air injection channel 81 and the common inlet channel 301 communicate with each other. Also, in the residual water removing step S800, the controller 280 may switch on the first valve 313, the second valve 323, and the third valve 333, and may switch on the main valve 9, and the valve 73.

When the air injection pump 82 is switched on, the air may sequentially pass through the air injection channel 81 and the common inlet channel 301, may be supplied to the first capsule holder 31, the second capsule holder 32, and the third capsule holder 33, and then may blow residual water remaining in the first capsule holder 31, the second capsule holder 32, and the third capsule holder 33 to the second main channel 4B. The air may be moved to the fermentation container 12 together with the residual water moved to the first capsule holder 31, the second capsule holder 32, and the third capsule holder 33. In the residual water removing step S800, the controller 280 may open the discharge valve 156.

As the residual water and the air are injected from the main channel 4 into the fermentation container 12, the fermentation container 12 may further expand, and the part of the air between the fermentation container 12 and the fermentation tank 112 may be pushed by the expanded fermentation container 12 to flow to the air supply channel 154, and may be discharged to the outside through the air discharge valve 156.

As the air between the fermentation container 12 and the fermentation tank 112 is discharged through the air supply channel 154 and the air discharge valve 156, the fermentation container 12 may easily expand, and the air and the residual water of the main channel 4 may be promptly introduced into the fermentation container 12. The controller 280 may switch on the air injection pump 82 during a residual water removal setting time, and may switch off the air injection pump 82 and switch off the first valve 313, the second valve 323, the third valve 333, the main valve 9, and the gas discharge valve 73 when the residual water removal setting time elapses. Also, the controller 280 may perform a control to close the air discharge valve 156. The beverage maker may complete the residual water removing step S800 when the residual water removal setting time elapses.

When the residual water removing step S800 is completed, the controller 280 may display a capsule separating message indicating that the capsules C1, C2, and C3 may be removed from the display 282, and the user may remove empty capsules from the material supplier 3. After the residual water removing step S800 is completed, the beverage maker may sequentially perform a primary fermenting step S900 and a secondary fermenting step S1000.

In the primary fermenting step S900, the controller 280 may control the compressor 131 and the heater 14 to help the beverage maker reach a primary fermentation target temperature. The controller 280 may control the compressor 131 and the heater 14 such that the temperature detected by the temperature sensor 16 is maintained in a primary fermentation temperature range. After the primary fermenting step S900 is initiated, the controller 280 may periodically switch on and then switch off the valve 73, and may store the pressure value detected by the pressure sensor 72 in a storage unit while the gas discharge valve 73 is switched on. When a change in the pressure or a pressure value periodically detected by the pressure sensor 72 exceeds a pre-set or predetermined first fermentation pressure change or pressure value, the controller 280 may determine that primary fermentation is completed, and may complete the primary fermenting step S900.

After the primary fermenting step S900 is completed, the controller 280 may initiate the secondary fermenting step S1000. In the secondary fermenting step S1000, the controller 280 may control the compressor 131 and the heater 14 in such a way where the beverage maker reaches a secondary fermentation target temperature. The controller 280 may control the compressor 131 and the heater 14 such that the temperature detected by the temperature sensor 16 is maintained in a secondary fermentation temperature range. After the secondary fermenting step S1000 is initiated, the controller 280 may periodically switch on and then switch off the gas discharge valve 73, and may store the pressure value detected by the pressure sensor 72 in a storage unit while the gas discharge valve 73 is switched on. When the change in the pressure or the value of the pressure periodically detected by the pressure sensor 72 exceeds a pre-set or predetermined second fermentation pressure change or pre-set or predetermined second fermentation pressure value, the controller 280 may determine that secondary fermentation is completed, and may complete the secondary fermenting step S1000.

When both the primary fermenting step S900 and the secondary fermenting step S1000 are completed, the beverage maker may perform a maturing step S1100. In the maturing step S1100, the controller 280 may stand by during a maturation time, and may control the compressor 131 and the heater 14 such that the temperature of the beverage is maintained between an upper limit of a pre-set or predetermined maturation temperature range and a lower limit of the pre-set or predetermined maturation temperature range during the maturation time.

Since the beverage maker is generally used indoors, the temperature of an outside of the beverage maker may be between the upper limit of the pre-set or predetermined maturation temperature range and the lower limit of the pre-set or predetermined maturation temperature range. However, the temperature of the outside of the beverage maker may be higher than the upper limit of the pre-set or predetermined maturation temperature range. In this case, the controller 280 may switch off the compressor 131 when the temperature detected by the temperature sensor 16 is less than or equal to the lower limit of the pre-set or predetermined maturation temperature range, and may switch on the compressor 131 when the temperature detected by the temperature sensor 16 is greater than or equal to the upper limit of the pre-set or predetermined maturation temperature range.

In the case where the temperature of the outside of the beverage maker is less than the lower limit of the pre-set or predetermined maturation temperature range, the controller 280 may switch on the heater 14 when the temperature detected by the temperature sensor 16 is less than the lower limit of the pre-set or predetermined maturation temperature range, and may switch off the heater 14 when the temperature detected by the temperature sensor 16 is greater than or equal to the upper limit of the pre-set or predetermined maturation temperature range.

When the maturation time elapses, the production of the beverage may be complete. The controller 280 may display completed production of the beverage through the display 282. The controller 280 may also control the compressor 131 such that the temperature of the fermentation tank 112 is maintained between an upper limit and a lower limit of a predetermined beverage temperature range. The controller 280 may switch on the compressor 131 when the temperature detected by the temperature sensor 16 is greater than or equal to the upper limit of the beverage temperature range, and may switch off the compressor 131 when the temperature detected by the temperature sensor 16 is less than the lower limit of the beverage temperature range. Accordingly, the beverage maker may keep the beverage cool so that it may always provide a cool beverage to the user.

The controller 280 may maintain the temperature of the fermentation tank 112 between the upper limit and the lower limit of the predetermined beverage temperature range until a beverage discharging step S1200 is completed. In the beverage discharging step S1200, the user may manipulate the dispenser 62 to discharge the beverage. When the user manipulates the dispenser 62 in an opened direction, the limit switch 630 may be contacted. Since the beverage is completely produced, the controller 280 may open the main valve 9.

When the main valve 9 is opened, the beverage in the fermentation container 12 may flow from the fermentation container 12 to the main channel 4 due to the pressure of the air between the fermentation container 12 and the fermentation tank 112, and may flow from the main channel 4 to the beverage discharge channel 61 to be discharged to the dispenser 62.

When the user manipulates the dispenser 62 in a closed direction after discharging a some of the beverage through the dispenser 62, contact on the limit switch 630 may cease, and the controller 280 may close the main valve 9. Thereafter, the controller 280 may switch on the air injection pump 82, and may also switch on and open the air supply valve 159. At this time, the air discharge valve 156 may be maintained closed.

When the air injection pump 82 is switched on, the air may sequentially pass through the air injection channel 81 and the air supply channel 154 and may then be supplied to the space 51 between the fermentation container 12 and the fermentation tank 112, and the air between the fermentation container 12 and the fermentation tank 112 may press the fermentation container 12 via a pressure that may raise the beverage in the fermentation container 12 to the second main channel 4B. This may create a sufficiently high pressure between the fermentation container 12 and the fermentation tank 112 such that the beverage in the fermentation container 12 is promptly discharged the next time a user discharges the beverage.

After the user discharges the beverage through the dispenser 62 at least one time, the controller 280 may determine whether the beverage is completely discharged using information about a time when the limit switch 630 is switched on, a time when an air pump 152 is driven, and a time when the main valve 9 is switched on after the beverage is completely produced, as an example. When the beverage is completely discharged, the controller 280 may close the air supply valve 159, and may open the air discharge valve 156.

When the beverage is completely discharged and the dispenser 62 is closed, the controller 280 switches on and opens the air discharge valve 156 during a completion setting time. When this control is performed such that the air discharge valve 156 is opened, the air between the fermentation container 12 and the fermentation tank 112 may be discharged to the air discharge valve 156 through the air supply channel 154, and a pressure between the fermentation container 12 and the fermentation tank 112 may be equal to the atmospheric pressure.

After the air discharge valve 156 is switched on, the controller 280 switches off and closes the air discharge valve 156 when the completion setting time elapses. When the washing and sterilizing step S1300 is not performed or the washing and sterilizing step S1300 does not include a main channel washing process, the controller 280 may display, on the display 282, a pack removing message to remove the fermentation container 12. The user may open the fermentation lid 107 to remove the fermentation container 12 from the fermentation tank assembly 111.

When the fermentation lid 107 is opened, if the pressure inside the fermentation tank 112 is at a higher pressure than the atmospheric pressure by a predetermined pressure change, the fermentation container 12 may bounce to the upper side of the fermentation tank 112 due to such a pressure difference.

On the other hand, when the air between the fermentation container 12 and the fermentation tank 112 is discharged through the air discharge valve 156 before the user opens the fermentation lid 107, the fermentation container 12 does not bounce to the upper side when the fermentation lid 107 is open, and is instead maintained inside the fermentation tank 112. That is, the user may safely withdraw the clean, previously used fermentation container 12 from the fermentation tank 112.

When all of the beverage in the fermentation container 12 is discharged, and the controller 280 determines that the beverage is completely discharged, the controller 280 may further perform the washing and sterilizing step S1300 after the beverage production. The washing and sterilizing step S1300 after the beverage production may include at least one of a discharge valve washing process and a main channel washing process. When the washing and sterilizing step S1300 includes both the discharge valve washing process and the main channel washing process, the sequence of those washing processes may change as needed.

Since the discharge valve washing process is equal to or similar to the above-described washing and sterilizing step S100 before the beverage production, duplicate contents will be omitted. Hereinafter, the main valve washing process will be described. When the limit switch 630 of the dispenser 62 is switched off, the controller 280 may switch on the water pump 52 and the water heater 53. Also, the controller 280 may open the main valve 9.

When the main channel washing process is initiated, the controller 280 may switch on the gas discharge valve 73 and/or the air discharge valve 156. The controller 280 may control the switch valve 20 to separately or simultaneously wash and sterilize the material supplier 3 and the bypass channel 4C. For example, the controller 280 may wash and sterilize the bypass channel 4C after washing and sterilizing the material suppler 3.

When the material supplier 3 is washed and sterilized, the controller 280 may control the switch valve 20 such that the first main channel 4A and the common inlet channel 301 communicate with each other, and may switch on the valves 313, 323, and 333. When the valves 313, 323, and 333 are switched on, the valves 313, 323, and 333 may be opened. When the bypass channel 4C is washed and sterilized, the controller 280 may control the switch valve 20 such that the first main channel 4A and the bypass channel 4C communicate with each other, and may switch on the bypass valve 35. When the bypass valve is switched on, the bypass valve 35 may be opened.

When the water pump 52 is switched on, water in the water tank 51 may flow to the water heater 52 and may be heated by the water heater 52. When the controller 280 controls the switch valve 20 such that the first main channel 4A and the common inlet channel 301 communicate with each other, the water (that is, hot water) heated by the water heater 53 may flow to the first capsule holder 31, the second capsule holder 32, and the third capsule holder 33 through the inlet channels 311, 321, and 331. The water heated by the water supplying heater 53 may flow to the second main channel 4B after passing through the first capsule holder 31, the second capsule holder 32, and the third capsule holder 33, and may be introduced into the empty fermentation container inside the fermentation tank 112 through the main channel connector 115.

When the controller 280 controls the switch valve 20 such that the first main channel 4A and the bypass channel 4C communicate with each other, the water (that is, the hot water) heated by the water heater 53 may flow to the bypass valve 35 through the bypass channel 4C. The water heated by the water heater 53 may flow to the second main channel 4B after passing through the bypass valve 35, and may be introduced into the empty fermentation container 12 inside the fermentation tank 112 through the main channel connector 115.

In the main channel washing process, the water used to wash and sterilize may be introduced into the fermentation container 12, now empty after the beverage has completely discharged. The fermentation container 12 may be expanded by the introduced water, and the air between the fermentation container 12 and the fermentation tank 112 may be pushed by the expanded fermentation container 12 and flow to the air supply channel 154, and may be discharged to the outside through the air discharge valve 156.

When the control is performed as described above, the first main channel 4A, the bypass channel 4C, the bypass valve 35, the capsule holders 31, 32, and 33, the second main channel 4B, and the main channel connector 115 may be washed and sterilized by the water heated by the water heater 53. The beverage maker may perform the above-described washing and sterilizing during a main channel washing set time, and may complete the main channel washing process after the main channel washing set time.

The controller 280 may switch off the water pump 52 and the water heater 53 after the main channel washing set time elapses, and may close the main valve 9, the bypass valve 35, the valves 313, 323, and 333, the gas discharge valve 73, and the air discharge valve 156. After the washing and sterilizing step S1300 is completed, the user may open the fermentation lid 107 and may withdraw the fermentation container 12 containing the water that was used in washing the fermentation tank assembly 111.

Figure 13:
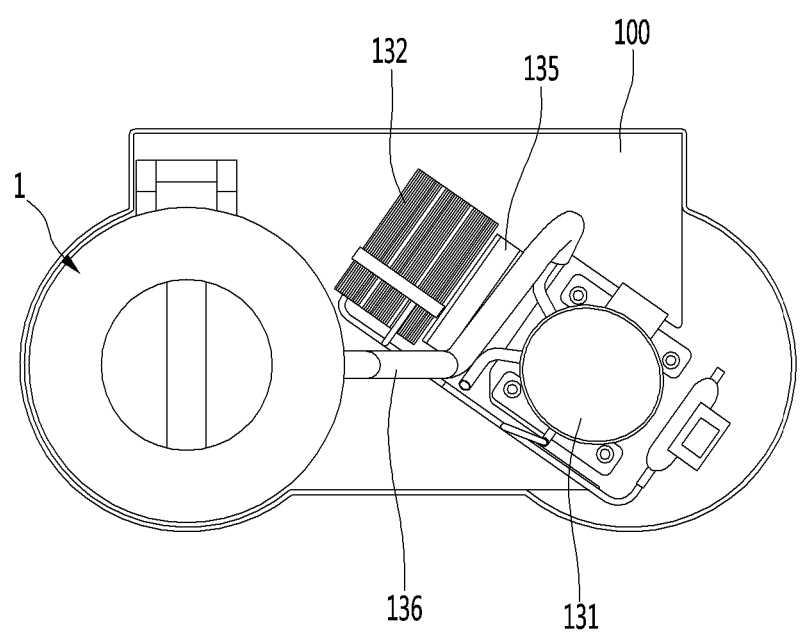
FIG. 13 is a plan view illustrating a state in which a refrigeration cycle and a fermentation device are mounted on a base according to another embodiment.
Figure 14:
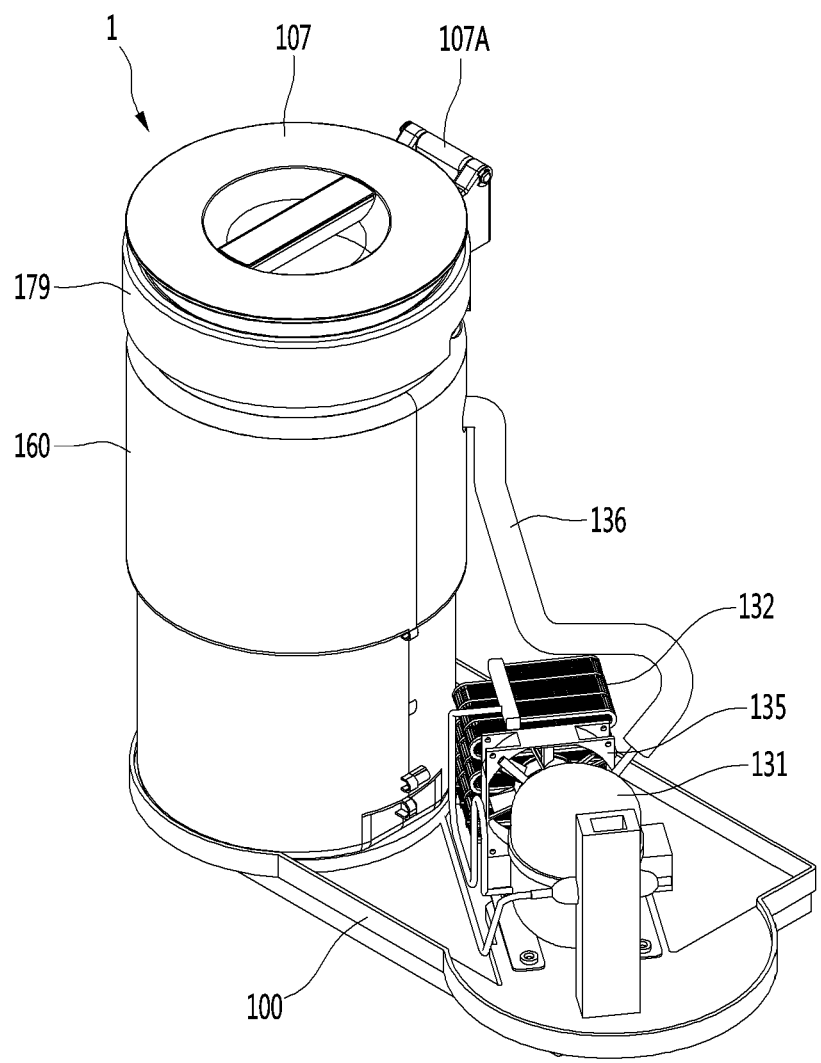
FIG. 14 is a perspective view illustrating a state in which a refrigeration cycle and a fermentation device are mounted on a base according to another embodiment.

FIG. 13 is a plan view illustrating a state in which a refrigeration cycle and a fermentation device are mounted on a base according to an embodiment, and FIG. 14 is a perspective view illustrating a state in which the refrigeration cycle and the fermentation device are mounted on the base according to another embodiment. Hereinafter, duplicate contents of the above description will be omitted, and a difference therebetween will be mainly described. The blower 135 of the beverage maker according to the present embodiment may be arranged between the compressor 131 and the condenser 132. The front surface of the blower 135 may be directed to the compressor 131, and the rear surface of the blower 135 may be directed to the condenser 132.

When the blower 135 is operated, air near the compressor 131 may be suctioned to the front surface of the blower 135, may be blown toward the condenser 132, and may pass through the condenser 132 and discharged to the through-hole 271 of the rear cover 220. Accordingly, heat of the compressor 131 and the condenser 132 may be simultaneously dissipated by the blower 135.

The compressor 131, the blower 135, and the condenser 132 may be arranged in a row or inline to be inclined in or angled toward a front-rear direction. A distance between the fermentation device 1 and the compressor 131 may be larger than a distance between the fermentation device 1 and the condenser 132. At least one of the compressor 131, the blower 135, and the condenser 132 may overlap with the fermentation device 1 in a front-rear direction. The cooling pipe 136 may be connected to a side or side portion of the fermentation device 1. Due to the above-described configurations, the beverage maker may become compact in a front-rear direction.

Figure 15:
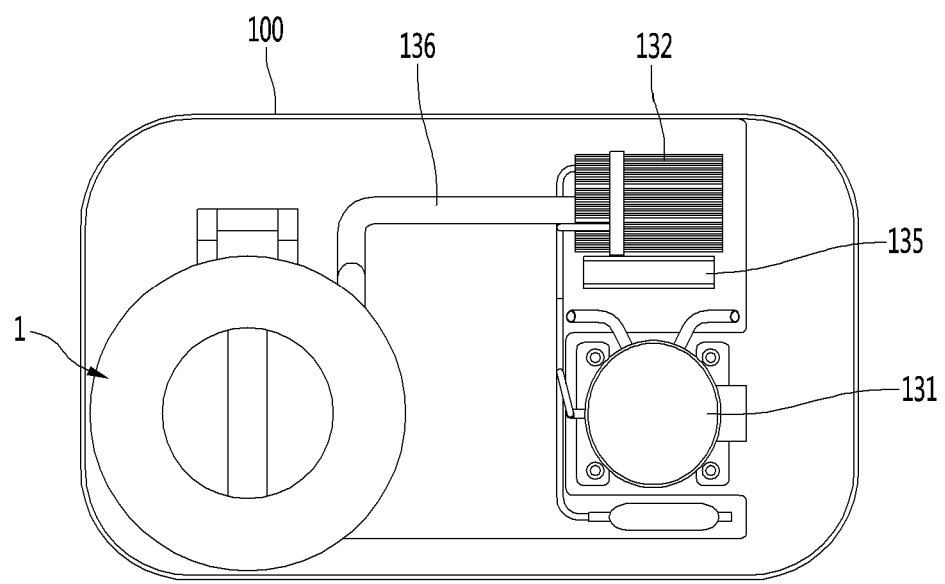
FIG. 15 is a plan view illustrating a state in which a refrigeration cycle and a fermentation device are mounted on a base according to yet another embodiment.
Figure 16:
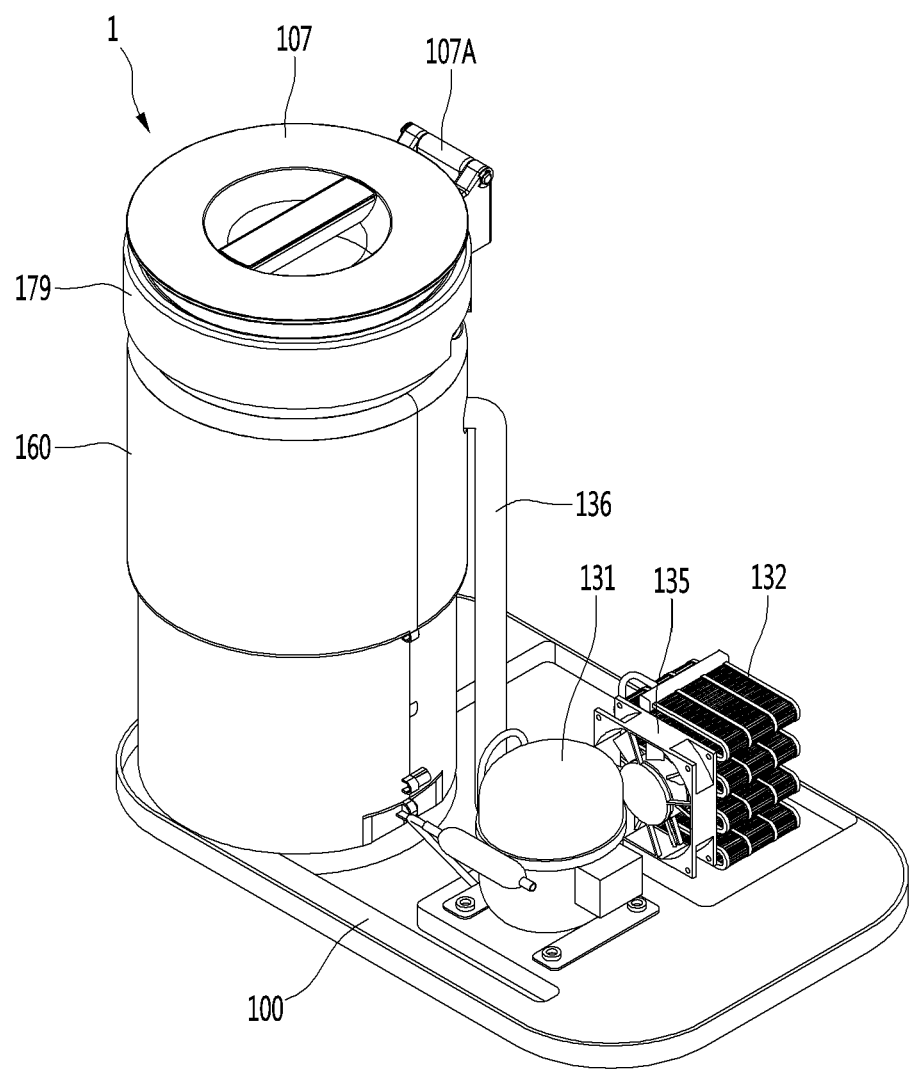
FIG. 16 is a perspective view illustrating a state in which a refrigeration cycle and a fermentation device are mounted on the base according to the yet another embodiment.

FIG. 15 is a plan view illustrating a state in which a refrigeration cycle and a fermentation device are mounted on a base according to yet another embodiment, and FIG. 16 is a perspective view illustrating a state in which the refrigeration cycle and the fermentation device are mounted on the base according to the yet another embodiment.

In the beverage maker according to an embodiment, like the above-described exemplary embodiments, the blower 135 may be arranged between the compressor 131 and the condenser 132. The front surface of the blower 135 may be directed to the compressor 131, and the rear surface of the blower 135 may be directed to the condenser 132. Accordingly, when the blower 135 is operated, air near the compressor 131 may be suctioned to the front surface of the blower 135, may be blown toward the condenser 132, and may pass through the condenser 132 and then discharged to the through-hole 271 of the rear cover 220. Accordingly, heat of the compressor 131 and the condenser 132 may be simultaneously dissipated by the blower 135.

However, unlike the above-described exemplary embodiments, the compressor 131, the blower 135, and the condenser 132 may be arranged in a row or inline in a front-rear direction. That is, the condenser 132 may be arranged behind the compressor 131, and the blower 135 may be arranged between the compressor 131 and the condenser 132. In addition, the cooling pipe 136 may be connected to a rear portion or rear of the fermentation device 1. As compared to a case where the compressor 131, the blower 135, and the condenser 132 are arranged in a row or inline to be inclined in or angled toward a front-rear direction, a size of the beverage maker may be slightly greater, but an inner space of the beverage maker may be enlarged. Accordingly, the beverage maker may be designed relatively easily. As the distance between the condenser 132 and the fermentation device 1 becomes larger, the temperature of the fermentation device 1 may be prevented from rising due to the heat generated by the condenser 132.

According to an exemplary embodiment, the temperature of the fermentation tank may be controlled by the refrigeration cycle such that the beverage may be produced at a proper or optimal fermentation temperature. The air blown by the blower fan or blower may pass through the condenser to be discharged to the through-hole formed in the rear cover. Accordingly, the condenser may be heat-discharged, and noise generated toward the front surface of the beverage maker may be reduced.

Also, the gas generated while the beverage is fermented may be guided to the gas discharge valve through the gas discharge channel, and may be discharged through the gas discharge valve to be discharged through the through-hole formed in the rear cover. Accordingly, the gas may be effectively discharged, and the noise generated toward the front surface of the beverage maker may be reduced. Also, since both the air used in the heat dissipation of the condenser and the air discharged through the gas discharge valve are discharged through the through-hole of the rear cover, the configuration and design of the beverage maker may be more simple.

The blower fan may be arranged to be directed toward a space between the compressor and the fermentation device such that flow of the air suctioned into the blower fan becomes smooth, and the condenser is effectively heat-dissipated. At least a part of the blower fan may be arranged between the fermentation device and the compressor in a front-rear direction such that the beverage maker becomes compact in a front-rear direction. When the compressor, the blower fan, and the condenser are arranged in a row or inline to be inclined in or angled toward a front-rear direction, the beverage maker may become compact in a front-rear direction.

Embodiments disclosed herein provide a beverage maker which may simply produce a beverage by adjusting a temperature of a fermentation tank by a refrigeration cycle. Embodiments disclosed herein also provide a beverage maker in which noise generated toward the front surface is reduced and heat of a condenser is effectively dissipated.

A beverage maker according to embodiments disclosed herein may include a fermentation module or fermentation device including a fermentation tank module or fermentation tank assembly having an opening formed therein, and a fermentation lid configured to open and/or close the opening, a refrigeration cycle device or refrigeration cycle having a compressor, a condenser, an expansion mechanism, and an evaporator formed therein in which a refrigerant circulates. The evaporator may be configured to adjust a temperature inside the fermentation tank module. The fermentation tank module may further include a blower fan or blower configured to dissipate heat of the condenser and a rear cover arranged behind the fermentation module that has a through-hole configured to discharge air blown by the blower fan.

The beverage maker may further include a gas discharging channel module or gas discharger connected to the fermentation module to discharge gas inside the fermentation module. The rear cover may be arranged behind the fermentation module and the through-hole may be formed in the rear cover to discharge air blown by the blower fan and the gas discharged from the gas discharging channel module through the through-hole. The condenser may be arranged between the blower fan and the through-hole.

The beverage maker according to embodiments disclosed herein may further include a main frame having a condenser accommodating space or condenser space formed therein in which the condenser is provided and which communicates with the through-hole. A blower fan mounted portion or blower mount on which the blower fan is mounted may be formed in the main frame, and the blower fan mounted portion may be located in front of the condenser accommodating space.

The gas discharging channel module may include a gas discharging channel or gas discharge channel connected to the fermentation module, and a gas discharging valve or gas discharge valve connected to the gas discharging channel, and a gas discharging space in which the gas discharging valve is arranged and which communicates with the through-hole may be further formed in the main frame.

A rear surface or rear of the condenser accommodating space and/or the gas discharging space or gas discharge space may be open. A barrier may be provided between the condenser accommodating space and the gas discharging space. The gas discharging valve may be located behind the fermentation module.

A beverage maker according to embodiments disclosed herein may include a fermentation module or fermentation device including a fermentation tank module or fermentation tank assembly. The fermentation tank module may have an opening formed therein, a fermentation lid configured to open and/or close the opening. The fermentation tank module may include a refrigeration cycle having a compressor, a condenser, an expansion mechanism, and an evaporator formed therein in which a refrigerant circulates and in which the evaporator is configured to adjust a temperature inside the fermentation tank module, a blower fan or blower having a front surface directed to a space between the compressor and the fermentation module and a rear surface directed to the condenser, and a rear cover arranged behind the fermentation module and having a through-hole located behind the condenser.

The compressor may be spaced apart from the fermentation module in a left-right direction. At least a part or portion of the blower fan may be located between the compressor and the fermentation module in a left-right direction, and the condenser may be arranged behind the blower fan.

A beverage maker disclosed herein may include a fermentation module or fermentation device that includes a fermentation tank module or fermentation tank assembly having an opening formed therein, and a fermentation lid configured to open and/or close the opening, a refrigeration cycle device or refrigeration cycle having a compressor, a condenser, an expansion mechanism, and an evaporator formed therein in which a refrigerant circulates. The evaporator may adjust a temperature inside the fermentation tank module, and the fermentation tank module may also include a blower fan or blower arranged between the compressor and the condenser, and a rear cover arranged behind the fermentation module that has a through-hole located behind the condenser. The compressor may be spaced apart from the fermentation module in a left-right direction. The compressor, the blower fan, and the condenser may be arranged in a row or inline in a front-rear direction. The compressor, the blower fan, and the condenser may further be arranged in a row or inline to be inclined in or angled toward a front-rear direction. A distance between the fermentation module and the compressor may be larger than a distance between the fermentation module and the condenser.

A beverage maker disclosed herein may include a fermentation module or fermentation device including a fermentation tank module or fermentation tank assembly having an opening formed therein and a fermentation lid configured to open and/or close the opening, a temperature controller configured to control a temperature inside the fermentation tank module, a blower fan or blower configured to dissipate heat of the temperature controller, a gas discharging channel module or a gas discharger connected to the fermentation module to discharge gas inside the fermentation module, and a cover having a through-hole formed therein such that air blown by the blower fan and the gas discharged from the gas discharging channel module are discharged through the same surface of the through-hole.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
a fermentation device comprising a fermentation tank having an opening, and a fermentation lid that opens and closes the opening;
a refrigeration cycle including a compressor, a condenser, an expansion mechanism, and an evaporator such that a refrigerant circulates in the compressor, the condenser, the expansion mechanism, and the evaporator, wherein the evaporator adjusts a temperature inside the fermentation tank;
a blower that dissipates heat emitted by the condenser;
a rear cover provided at a rear side of the fermentation device, the rear cover including a through-hole through which air blown by the blower is discharged;
a gas discharge channel connected to the fermentation lid; and
a gas discharge valve connected to the gas discharge channel, the gas discharge valve being provided in front of the rear cover to discharge gas inside the fermentation tank through the through-hole.

2. The beverage maker of claim 1, wherein the condenser is provided between the blower and the through-hole.

3. The beverage maker of claim 1, further comprising:
a main frame having a condenser space formed in the main frame such that the condenser is provided in the condenser space and the condenser space communicates with the through-hole.

4. The beverage maker of claim 3, wherein the main frame further includes a blower mount on which the blower is mounted, wherein the blower mount is provided in the condenser space.

5. The beverage maker of claim 4,
wherein the main frame further includes a gas discharge space in which the gas discharge valve is provided and which communicates with the through-hole.

6. The beverage maker of claim 5, wherein at least one of a rear surface of the main frame forming the condenser space or a rear surface forming the gas discharge space is open.

7. The beverage maker of claim 5, wherein a barrier is provided between the condenser space and the gas discharge space.

8. The beverage maker of claim 5, wherein the gas discharge valve is located at the rear side of the fermentation device.

9. The beverage maker of claim 1, wherein the compressor is spaced apart from the fermentation device in a lateral direction.

10. The beverage maker of claim 1, wherein the compressor, the blower, and the condenser are arranged in a row in a frontward-rearward direction.

11. The beverage maker of claim 1, wherein the compressor, the blower, and the condenser are arranged along a row at an incline in or angle in a frontward-rearward direction.

12. The beverage maker of claim 1, wherein a distance between the fermentation device and the compressor is greater than a distance between the fermentation device and the condenser.

13. A beverage maker, comprising:
a fermentation device comprising a fermentation tank having an opening formed in the fermentation tank, and a fermentation lid that opens and closes the opening;
a temperature controller that controls a temperature inside the fermentation tank;
a blower configured to dissipate heat of the temperature controller;
a gas discharge channel connected to the fermentation lid that discharges the gas from inside the fermentation tank to outside of the fermentation tank;
a gas discharge valve channel connected to the discharge channel; and
a cover having a through-hole such that air blown by the blower and the gas discharged from the gas discharge valve are discharged through a same surface of the cover through the through-hole.

14. A beverage maker, comprising:

a fermentation device comprising a fermentation tank assembly having an opening, and a fermentation lid that opens and closes the opening;

a refrigeration cycle including a compressor, a condenser, an expansion mechanism, and an evaporator such that a refrigerant circulates in the compressor, the condenser, the expansion mechanism, and the evaporator;

a blower that suctions air from a space between the compressor and the fermentation device, and blows air toward the condenser;

a cover having a through-hole through which air blown by the blower is discharged;

a gas discharge channel connected to the fermentation lid; and a gas discharge valve connected to the gas discharge channel, the gas discharge valve being disposed in front of the cover to discharge gas inside the fermentation tank through the through-hole.

15. A beverage maker, comprising:

a fermentation tank configured to store a fermenting liquid mixture that generates gas;

a fermentation lid that opens and closes the fermentation tank;

a temperature controller that controls a temperature inside the fermentation tank;

a blower configured to dissipate heat of the temperature controller;

a gas discharger connected to the fermentation lid to exhaust the gas generated from the liquid inside the fermentation tank;

a cover covering at least a portion of the fermentation tank and the blower, the cover having a through-Whole through which air blown by the blower and gas exhausted from the gas discharger are discharged; and a dispenser configured to dispense the liquid in the fermentation tank.

16. The beverage maker of claim 15, wherein the temperature controller includes a compressor, a condenser, an expansion mechanism, and an evaporator.

* * * * *